United States Patent
Otagiri et al.

(10) Patent No.: US 7,034,976 B2
(45) Date of Patent: Apr. 25, 2006

(54) SUBSTRATE FOR ELECTROOPTIC DEVICE AND METHOD OF MANUFACTURING THE SAME, ELECTROOPTIC DEVICE, AND ELECTRONIC EQUIPMENT

(75) Inventors: Yoshihiro Otagiri, Matsumoto (JP); Keiji Takizawa, Hotaka (JP); Tomoyuki Nakano, Suwa (JP); Hideki Kaneko, Suwa (JP); Chihiro Tanaka, Matsumoto (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 11/087,883

(22) Filed: Mar. 23, 2005

(65) Prior Publication Data

US 2005/0162726 A1    Jul. 28, 2005

Related U.S. Application Data

(63) Continuation of application No. 10/321,286, filed on Dec. 17, 2002.

(30) Foreign Application Priority Data

Dec. 17, 2001 (JP) .............................. 2001-383023
Oct. 17, 2002 (JP) .............................. 2002-303217

(51) Int. Cl.
  *G02B 26/00*   (2006.01)
  *G02B 1/03*    (2006.01)
  *H01L 21/00*   (2006.01)

(52) U.S. Cl. ....................... 359/237; 359/245; 359/248; 438/30

(58) Field of Classification Search ................ 359/237, 359/245, 252, 253, 248; 438/30
See application file for complete search history.

(56) References Cited

U.S. PATENT DOCUMENTS

| | | | |
|---|---|---|---|
| 6,281,952 B1 | 8/2001 | Okamoto et al. | 349/12 |
| 6,330,047 B1 | 12/2001 | Kubo et al. | 349/147 |
| 2001/0019385 A1 | 9/2001 | Song et al. | 349/113 |
| 2001/0022634 A1 | 9/2001 | Chung et al. | 349/43 |
| 2001/0048496 A1 | 12/2001 | Baek | 349/14 |
| 2002/0088984 A1 | 7/2002 | Toda et al. | 257/99 |
| 2003/0025977 A1 | 2/2003 | Takizawa et al. | 359/245 |

(Continued)

FOREIGN PATENT DOCUMENTS

| | | |
|---|---|---|
| JP | 2000-267081 | 9/2000 |
| JP | 2001-033778 | 2/2001 |
| JP | 2001-221995 | 8/2001 |

(Continued)

OTHER PUBLICATIONS

Communication from Japanese Patent Office regarding counterpart application.

(Continued)

*Primary Examiner*—Timothy Thompson
(74) *Attorney, Agent, or Firm*—Harness, Dickey & Pierce, P.L.C.

(57) ABSTRACT

A substrate for an electrooptic device comprising a light-transmissive base member, a reflection layer formed on the base member so as to include each reflection portion and a corresponding transmission portion having a transmission factor higher than that of the reflection portion, a light transmission layer formed over the base member so as to coincide with the reflection layer and to include each hollow at a position that coincides with the transmission portion in plane, and an orientation film formed over the base member so as to coincide with the light transmission layer and to define a concavity while entering the corresponding hollow. The thickness "b" of a liquid crystal layer corresponding to the concavity is greater than the thickness "a" of the liquid crystal layer at the other positions thereof.

24 Claims, 19 Drawing Sheets

U.S. PATENT DOCUMENTS

2003/0142253 A1    7/2003    Takenakawa  ............... 349/113

FOREIGN PATENT DOCUMENTS

JP        2001-281662      10/2001
JP        2003-107436      4/2003

OTHER PUBLICATIONS

Communication from Japanese Patent Office re: counterpart application.

SUBSTRATE FOR ELECTROOPTIC DEVICE AND METHOD OF MANUFACTURING THE SAME, ELECTROOPTIC DEVICE, AND ELECTRONIC EQUIPMENT

CROSS-REFERENCE TO RELATED APPLICATIONS

This application is a continuation of U.S. Ser. No. 10/321,286 filed Dec. 17, 2002, claiming priority to Japanese Application No. 2001-383023 filed Dec. 17, 2001 and Japanese Application No. 2002-303217 filed Oct. 17, 2002, all of which are hereby incorporated by reference.

DETAILED DESCRIPTION OF THE INVENTION

1. Technical Field to which the Invention Belongs

The present invention relates to a substrate for use in an electrooptic device such as a liquid crystal device or an organic EL device, as well as a method of manufacturing the substrate, the electrooptic device such as the liquid crystal device, and an electronic equipment constructed by employing the electrooptic device.

2. Prior Art

There has heretofore been known an electrooptic device, for example, a liquid crystal device of a semitransmissive reflection type wherein both reflection type display utilizing external light and transmission type display utilizing light from an illuminator such as backlighting unit can be visually recognized. With the liquid crystal device of the semitransmissive reflection type, a reflection layer for reflecting the external light is disposed at an inner part, and the illuminating light from the backlighting unit or the like can be transmitted through the reflection layer. As the reflection layer of this type, there has hitherto been one of a structure which has a transmission portion, for example, an opening of appropriate area at every display dot being the minimum unit of display in the liquid crystal device.

FIG. 19 shows a prior-art example of the liquid crystal device of the semitransmissive reflection type. In this liquid crystal device 1000, a substrate 1001 and a substrate 1002 are held together by a sealing member 1003, and a liquid crystal 1004 is enclosed between the substrates 1001 and 1002.

A reflection layer 1011 (which is provided with openings 1011a being transmission portions at respective display dots) is formed on the inner surface of the substrate 1001, and a color filter 1012 is formed on the reflection layer 1011. The color filter 1012 includes colored layers 1012r, 1012g, 1012b and a surface protection layer 1012p. Also, transparent electrodes 1013 are formed on the surface of the surface protection layer 1012p of the color filter 1012.

On the other hand, transparent electrodes 1021 are formed on the inner surface of the substrate 1002. The transparent electrodes 1021 are constructed so as to intersect with the transparent electrodes 1013 on the opposing substrate 1001. Incidentally, the transparent electrodes 1013 on the substrate 1001 and the transparent electrodes 1021 on the substrate 1002 are properly overlaid with orientation films, hard transparent films, etc. as may be needed.

Also, a phase difference plate, for example, a quarter wavelength plate 1005 and a polarization plate 1006 are successively arranged on the outer surface of the substrate 1002. Also, a phase difference plate, for example, a quarter wavelength plate 1007 and a polarization plate 1008 are successively arranged on the outer surface of the substrate 1001.

In a case where the prior-art liquid crystal device 1000 constructed as stated above is applied to electronic equipment such as a cellular telephone or portable type personal computer, a backlighting unit 1009 is sometimes arranged at the rear of the liquid crystal device. With the liquid crystal device 1000, in the daytime or in a bright place such as in the interior of a house, external light passes through the liquid crystal 1004 and is thereafter reflected from the reflection layer 1011, and the reflected light passes through the liquid crystal layer 104 again, along a reflection path R, whereby the light is emitted outside. Due to this light, reflection type display is visually recognized.

On the other hand, at nighttime or in a dark place such as on the exterior of a house, the backlighting unit 1009 is lit up, whereby that component of the illuminating light of the backlighting unit 1009 which has passed through each transmission portion 1011a passes through the liquid crystal device 1000 along a transmission path T, thereby to be emitted outside. Due to the light component, transmission type display is visually recognized.

The liquid crystal device 1000 of such a semitransmissive reflection type, however, has had problems as stated below, due to the adoption of the two different display schemes of the reflection type display and the transmission type display.

In case of employing the liquid crystal device 1000 in reflection type mode, the external light entering from the front of the display portion of the liquid crystal device 1000 passes through the liquid crystal layer 1004 and is thereafter reflected from the reflection layer 1011, and the reflected light passes through the liquid crystal layer 1004 again, so that the light passes through the liquid crystal layer 1004 twice until an image is displayed. In contrast, in the case of employing the liquid crystal device 1000 in a transmission type mode, the light entering from the backlighting unit 1009 passes through the liquid crystal layer 1004 only once.

When the display schemes differing in this manner are adopted, a phase difference develops between the light that passes through the liquid crystal layer 1004, and the retardation value ($\Delta n \cdot d$ where $\Delta n$ denotes a refractive index anisotropy, and d denotes the thickness of the liquid crystal layer) of the liquid crystal layer becomes different. The retardation value affects a light transmission factor, and the utilization efficiencies of the light become different in the respective display schemes. Thus, when the thickness of the liquid crystal layer is determined so that the retardation value ($\Delta n \cdot d$) may become the optimum value in the reflection type display usually liable to darken, there has been the problem that, in the transmission type display, the utilization efficiency of the transmitted light becomes low, so a sufficient brightness cannot be attained.

Also, there is a method wherein the area of each transmission portion 1011a of the reflection layer 1011 is made smaller in order to brighten the reflection type display. However, there has been the problem that, when the area of each transmission portion 1011a is decreased, the brightness of the transmission type display lowers.

As stated above, brightening the reflection type display and brightening the transmission type display are in an antinomic relationship (i.e., contradictory), and there has been the problem that the compatibility of the two is very difficult.

Also, when the reflection type display is brightened by decreasing the area of each transmission portion 1011a, the quantity of the illuminating light of the backlighting unit 1009 needs to be enlarged for the purpose of ensuring the brightness of the transmission type display. This has resulted in the problem that various characteristics required of electronic equipment, especially portable type equipment, such as reducing the size of the liquid crystal device, thinning the structure thereof, reducing the weight thereof and lowering the power consumption thereof, cannot be satisfactorily met.

The present invention has been made in view of the above problems, and one object is to heighten the utilization efficiency of the transmitted light in the transmission type display without lowering the brightness of the image display in the reflection type display, in an electrooptic device, for example, the liquid crystal device of the semitransmissive reflection type.

SUMMARY OF THE INVENTION

In order to accomplish the above object, a substrate for an electrooptic device according to the present invention is characterized by comprising a light-transmissive base member; a reflection layer which is formed on said base member, and which includes a reflection portion, and a transmission portion having a transmission factor higher than that of the reflection portion; a light transmission layer which is formed over said base member so as to coincide with said reflection layer, and which includes a hollow at a position thereof coinciding with the transmission portion in plane; and an orientation film which is formed over said base member so as to coincide with said light transmission layer and to define a concavity while entering the hollow.

In the above construction, the "hollow" can be formed by providing, for example, an opening, namely, a through hole or a concavity, namely, a bottomed hole in the light transmission layer.

When a case is considered where the substrate for an electrooptic device as has the above construction is applied to the electrooptic device, for example, a liquid crystal device, the utilization efficiency of transmitted light in a transmission type display can be heightened without lowering the brightness of an image display in a reflection type display. Further, when the brightness of the transmitted light is sufficiently ensured by heightening the utilization efficiency of the transmitted light, the area of the transmission portion may be reduced, that is, to increase the area of the reflection portion, whereby the reflection type display usually liable to darken can be brightened.

In the substrate for an electrooptic device having the above construction, an electrode can be arranged at a position between the light transmission layer and the orientation film corresponding to the reflection portion of the reflection layer. Besides, in this case, the electrode can be constructed so as to define a concavity on the surface of the light transmission layer while entering the hollow thereof.

In the substrate for an electrooptic device having the above construction, the transmission portion of the reflection layer can be formed by an opening which is provided in the reflection layer, or a part of the reflection layer can be made thinner than the other part thereof.

In the substrate for an electrooptic device having the above construction, the light transmission layer should desirably include a parent material, and particles which are dispersed in the parent material and which have a refractive index different from that of the parent material.

Next, another substrate for an electrooptic device according to the present invention is characterized by comprising a light-transmissive base member; an underlayer which is formed on said base member, and which includes a hollow; a reflection layer which is formed over said base member so as to coincide with said underlayer, and which includes a reflection portion, and a transmission portion having a transmission factor higher than that of the reflection portion; and an orientation film which is formed over said base member so as to coincide with said reflection layer; the transmission portion of said reflection layer and the hollow of said underlayer coinciding with each other in plane; said orientation film defining a concavity while entering said hollow of said underlayer.

When a case is considered where the substrate for an electrooptic device having the above construction is applied to the electrooptic device, for example, a liquid crystal device, the utilization efficiency of transmitted light in a transmission type display can be heightened without lowering the brightness of an image display in a reflection type display. Further, due to the existence of the underlayer, the passing distance of reflected light can be shortened, whereby reflection characteristics in the reflection display can be enhanced.

In the substrate for an electrooptic device having the above construction, the transmission portion of the reflection layer can be formed by an opening which is provided in the reflection layer.

Also, in the substrate for an electrooptic device having the above construction, an electrode can be arranged at a position between the underlayer and the orientation film corresponding to the reflection portion of the reflection layer. Also, in this case, the electrode should desirably be formed so as to define a concavity while entering the hollow of the underlayer.

Also, in the substrate for an electrooptic device having the above construction, the underlayer should desirably have unevenness in a region of its surface on the side of the reflection layer, except the hollow.

Next, another substrate for an electrooptic device according to the present invention is characterized by comprising a light-transmissive base member; a reflection layer which is formed on said base member, and which includes a reflection portion, and a transmission portion having a transmission factor higher than that of the reflection portion; an insulating layer which is formed over said base member so as to coincide with said reflection layer, and which includes a hollow at a position thereof coinciding with the transmission portion in plane; and an orientation film which is formed over said base member so as to coincide with said insulating layer, and which defines a concavity while entering the hollow.

When a case is considered where the substrate for an electrooptic device having the above construction is applied to the electrooptic device, for example, a liquid crystal device, the orientation film makes the orientation of the liquid crystal layer uniform so as to effectively polarize light, whereby the utilization efficiency of the transmitted light in a transmission type display can be heightened without lowering the brightness of an image display in a reflection type display.

Next, a method of manufacturing a substrate for an electrooptic device according to the present invention is characterized by comprising the step of forming an insulating layer on a reflection layer; the step of patterning the insulating layer; the step of developing the reflection layer by employing the patterned insulating layer as a mask, thereby forming an opening in the reflection layer; and the step of forming an electrode on the insulating layer and the opening.

When a case is considered where the manufacturing method of this construction is applied to the electrooptic device, for example, a liquid crystal device, it is possible to manufacture a substrate for an electrooptic device which heightens the utilization efficiency of transmitted light in a transmission type display without lowering the brightness of an image display in a reflection type display. Furthermore, since the insulating layer can be utilized as the mask in the case of exposing the reflection layer to light, a manufacturing process can be shortened, and hence, the substrate for the electrooptic device can be manufactured easily and at low cost.

Next, an electrooptic device according to the present invention is characterized by comprising a substrate for the electrooptic device having the construction defined above; a second substrate which is arranged opposite to said substrate for the electrooptic device; and a second orientation film which is disposed on said second substrate; wherein an interval between the first orientation film and the second orientation film at a position corresponding to said transmission portion of said reflection layer is larger than an interval between said first orientation film and said second orientation film at a position corresponding to said reflection portion of said reflection layer.

Next, an electrooptic device according to the present invention is characterized by comprising a substrate having the construction defined above; and an electrooptic substance layer which is supported by said substrate for said electrooptic device; wherein thickness of said electrooptic substance layer at a position corresponding to said transmission portion of said reflection layer is larger than a thickness of said electrooptic substance layer at a position corresponding to said reflection portion of said reflection layer.

Next, an electrooptic device according to the present invention is characterized by comprising a substrate having the construction defined above; a second substrate which is arranged in opposition to said substrate for said electrooptic device; and a liquid crystal layer which is interposed between said substrate for electrooptic device and said second substrate; wherein, letting "a" denote a thickness of said liquid crystal layer at a position corresponding to said reflection portion of said reflection layer, and "b" denote a thickness of said liquid crystal layer at a position corresponding to said transmission portion of said reflection layer, the following relational formula is satisfied:

$$1.8a \leq b \leq 2.4a$$

In the electrooptic device of the above construction, letting $\Delta n \cdot a$ denote a product between a refractive index anisotropy $\Delta n$ of a nematic liquid crystal which forms said liquid crystal layer, and said thickness "a" of said liquid crystal layer at the position corresponding to said reflection portion of said reflection layer, and $\Delta n \cdot b$ denote a product between the refractive index anisotropy $\Delta n$ of the nematic liquid crystal and said thickness "b" of said liquid crystal layer at the position corresponding to said transmission portion of said reflection layer, the following relational formula is satisfied:

$$1.8 \times \Delta n \cdot a \leq \Delta n \cdot b \leq 2.4 \times \Delta n \cdot a$$

In the electrooptic device of the above construction, the second substrate can include a colored layer which is disposed so as to coincide with the reflection layer in plane.

In the electrooptic device of the above construction, the second substrate can include an electrode which is arranged so as to coincide with the colored layer in plane, and a switching element which is connected to the electrode.

Next, an electronic equipment according to the present invention is characterized by comprising an electrooptic device having the construction defined above, and control means for controlling an operation of said electrooptic device.

DETAILED DESCRIPTION OF THE PREFERRED EMBODIMENTS

Figure 1:
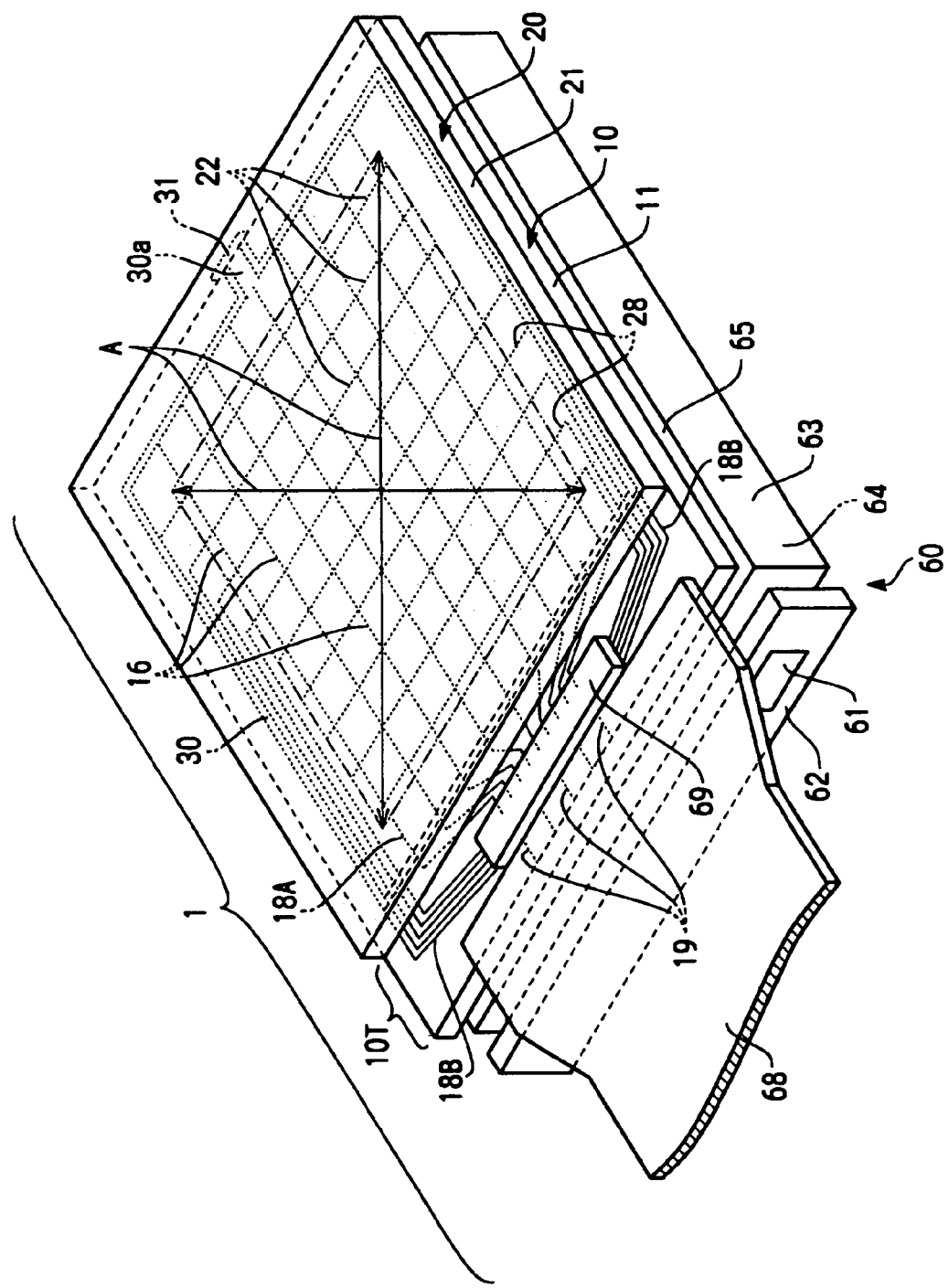
FIG. 1 is a perspective view of a liquid crystal device showing one embodiment of each of a substrate for an electrooptic device and the electrooptic device according to the present invention.

Now, substrates for electrooptic devices and the electrooptic devices according to the present invention will be described with reference to the drawings by taking substrates for liquid crystal devices and the liquid crystal devices as examples. By the way, in the drawings used in the description of these embodiments, individual layers and individual members have respectively different reduced scales for the purpose of making them large enough to be recognized on the drawings.

First Embodiment

Figure 2:
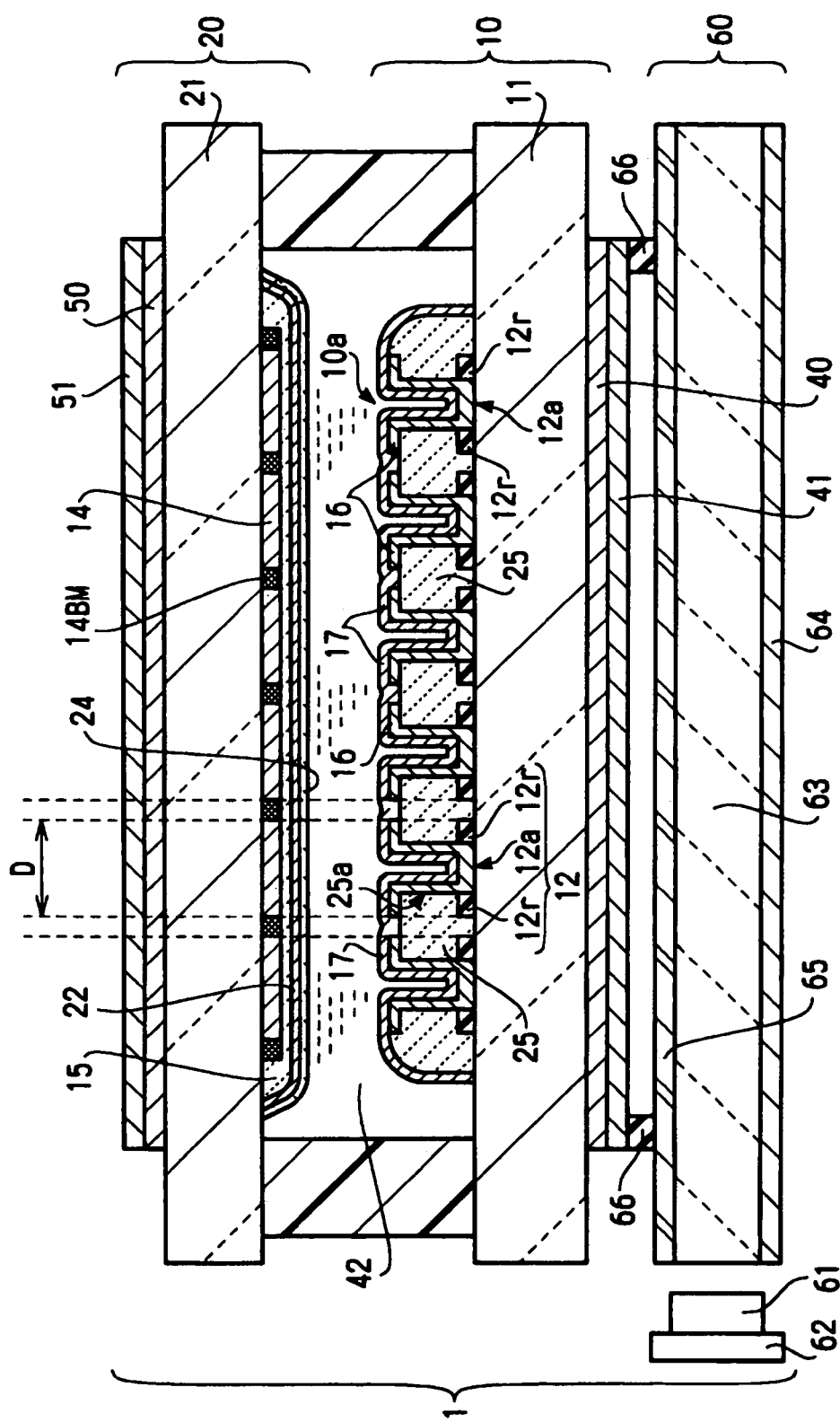
FIG. 2 is a sectional view showing the sectional structure of the liquid crystal in FIG. 1.
Figure 3:
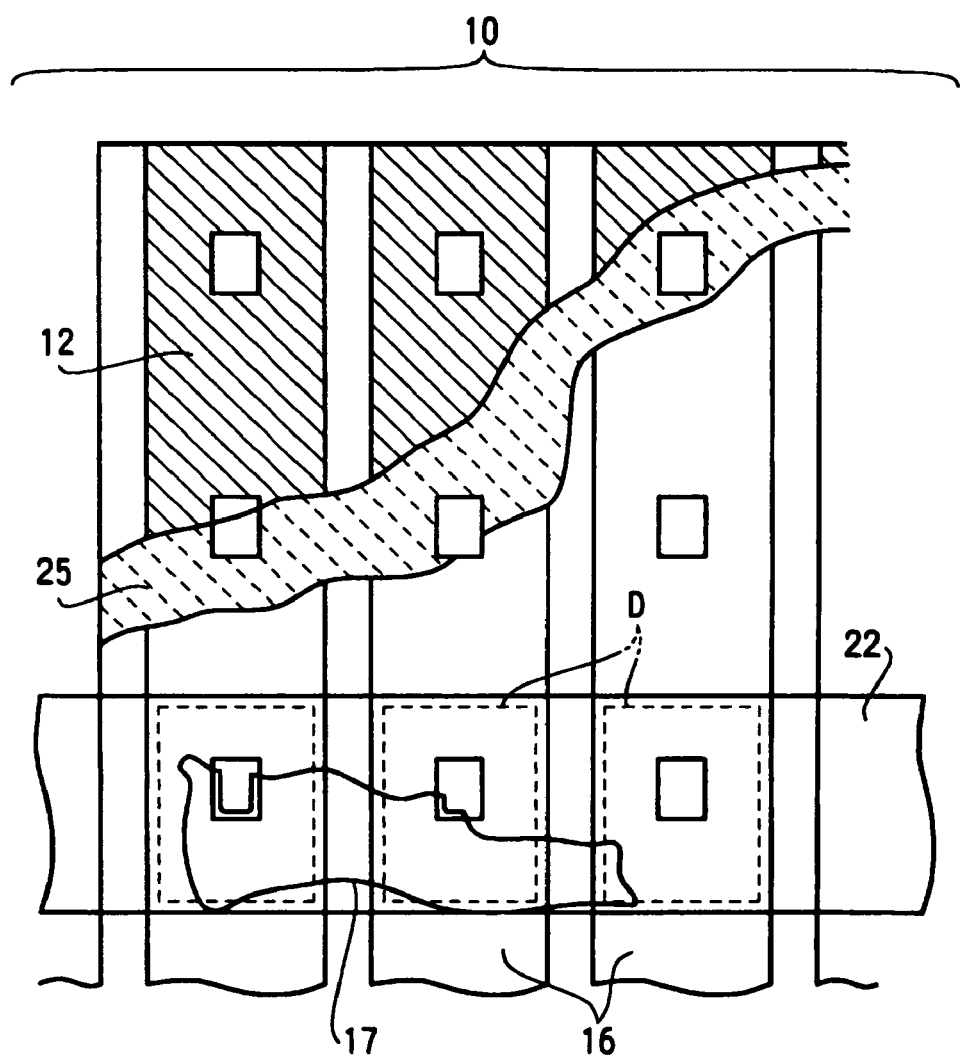
FIG. 3 is a plan view showing the principal portions of one example of the substrate for the liquid crystal device, on an enlarged scale.
Figure 4:
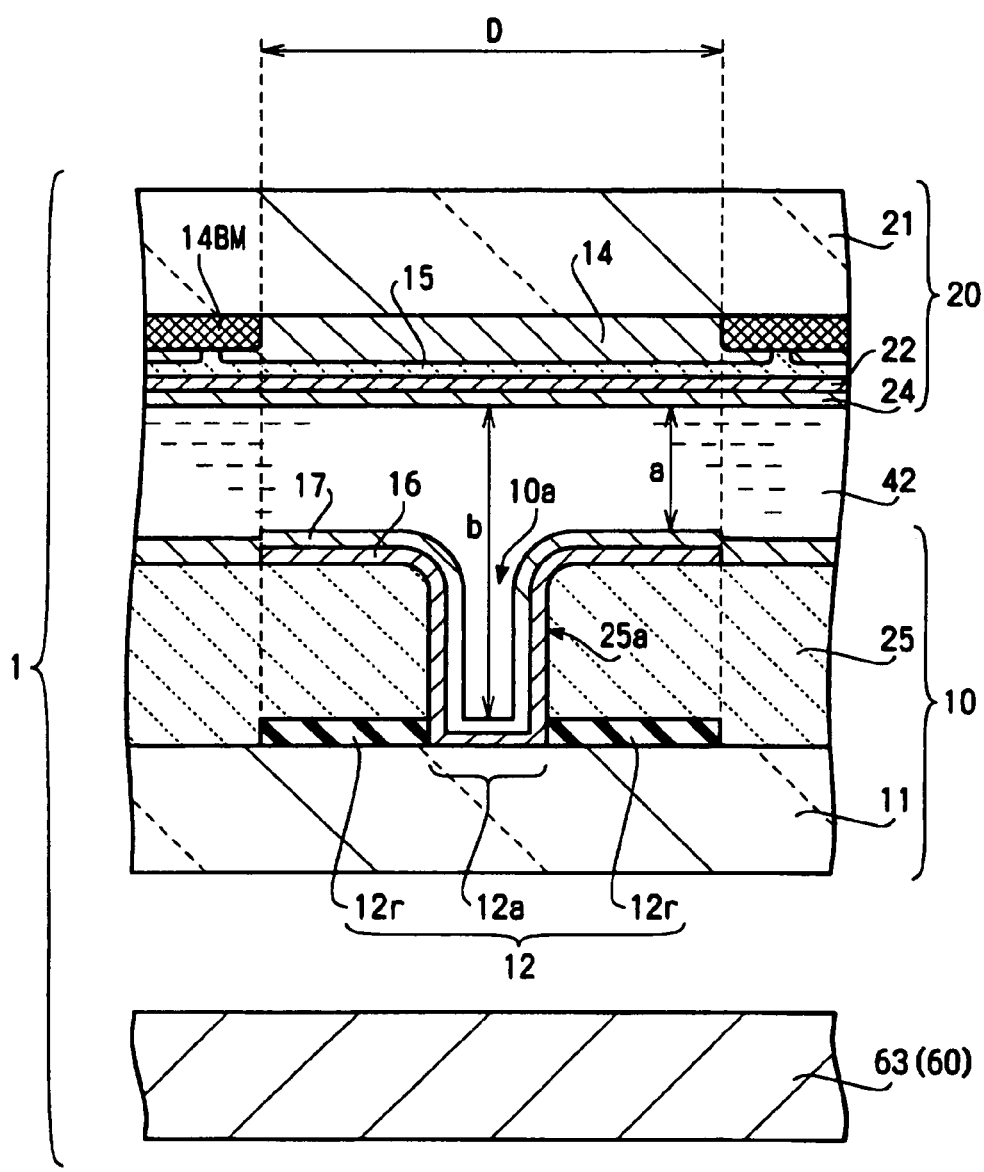
FIG. 4 is a sectional view showing one display dot part of FIG. 2, on an enlarged scale.

First, a liquid crystal device which is one embodiment of the electrooptic device of the present invention will be described with reference to FIGS. 1 through 4. FIG. 1 shows the external appearance structure of the liquid crystal device in this embodiment. FIG. 2 shows the sectional structure of the liquid crystal device. FIG. 3 shows several display dot parts in a substrate for the liquid crystal device as constitutes this liquid crystal device, in plane and on an enlarged scale. FIG. 4 shows portions in FIG. 2 on an enlarged scale. Incidentally, a liquid crystal device 1 shown here is one of passive matrix scheme of so-called "semitransmissive reflection type".

As shown in FIG. 1, the liquid crystal device 1 includes a substrate for the liquid crystal device 10, whose basic body is a first base member 11 made of a glass plate, a synthetic resin plate or the like and being transparent or having light transmissivity, and an opposing substrate 20 whose basic body is a second base member 21 opposing the substrate 10 and being similar thereto. The substrates 10 and 20 are held to each other by a sealing member 30. Also, a liquid crystal is injected through an injection port 30a into a region which is defined between the substrates 10 and 20 and which is enclosed with the sealing member 30, and the injection portion 30a is thereafter sealed off by a sealant 31. Thus, a cell structure having a liquid crystal layer is formed.

A plurality of parallel stripe-shaped transparent electrodes 16 are formed on the inner surface of the first base member 11 (that is, the surface thereof opposing the second base member 21), while a plurality of parallel stripe-shaped transparent electrodes 22 are formed on the inner surface of the second base member 21. Also, the transparent electrodes 16 are conductively connected to wiring lines 18A, while the transparent electrodes 22 are conductively connected to wiring lines 28. The transparent electrodes 16 and the transparent electrodes 22 intersect orthogonally to each other, the regions of the intersections form a large number of display dots arrayed in the shape of a matrix, and a display region A is defined by the set of these display dots.

The first base member 11 has an extension 10T which extends outside the second base member 21. Formed on the extension 10T are wiring lines 18B which are conductively connected to the wiring lines 18A and the wiring lines 28 through vertical conduction portions constructed of parts of the sealing member 30, and input terminal portions 19 which are made up of a plurality of wiring patterns formed independently. Also, a semiconductor integrated circuit (IC) 69 in which liquid crystal drive circuits etc. are built is mounted on the extension 10T so as to be conductively connected to the wiring lines 18A, 18B and the input terminal portions 19. Further, a flexible wiring board 68 is mounted on an end part of the extension 10T so as to be conductively connected to the input terminal portions 19.

In the liquid crystal device 1, as shown in FIG. 2, a quarter wavelength plate 40 in the form of a phase difference plate and a polarization plate 41 are arranged on the outer surface of the first base member 11, while a quarter wavelength plate 50 in the form of a phase difference plate and a polarization plate 51 are arranged on the outer surface of the second base member 21. Also, as shown in FIGS. 1 and 2, an illuminator 60 whose light source is an LED 61 or the like is disposed on the rear surface of the liquid crystal device 1 through buffer members 66.

The LED 61 is fixed by an LED substrate 62. Illuminating light emitted from the LED 61 is introduced into the first base member 11 by a light guide 63. A diffusion sheet 65 is mounted on the surface of the light guide 63 near to the liquid crystal layer, while a reflection sheet 64 is mounted on the surface of the light guide 63 on the opposite side.

Structure of the Substrate for the Liquid Crystal Device

Next, the structure of the substrate for the liquid crystal device 10, will be described with reference to FIGS. 2, 3 and 4. A reflection layer 12 is formed on the surface of the first base member 11. The reflection layer 12 is formed of, for example, aluminum, silver or an alloy thereof, or laminated films of aluminum, silver or an alloy thereof and titanium, titanium nitride, molybdenum, tantalum or the like.

As shown in FIG. 4, the reflection layer 12 is provided with a reflection portion 12r for reflecting external light, and a transmission portion 12a for transmitting the light, every display dot D. The transmission portion 12a of the reflection layer 12 can be formed of an opening, namely, a through hole which is provided in the reflection layer 12, or it can also be formed of a part which is thinner than the other portions of the reflection layer 12. In this embodiment, the transmission portion 12a is formed as an opening, namely, the through hole.

Incidentally, when the transmission portion 12a is formed as the part thinner than the other part, the joined part between the first base member 11 and the reflection layer 12 is not exposed to the exterior, so that impurities such as water can be prevented from entering the joined part. Therefore, the reflection layer 12 can be held in a stable state.

An insulating layer 25 is formed on the reflection layer 12 by using, for example, an inorganic material such as $SiO_2$ or $TiO_2$ or an organic resin such as acrylic resin or epoxy resin. The insulating layer 25 is formed with an opening, namely, a through hole 25a in the form of a hollow, in a region which coincides with the transmission portion 12a of the reflection layer 12 in plane.

Incidentally, the insulating layer 25 may well be a light transmission layer which, in effect, transmits light. Also, the hollow 25a of the insulating layer 25 can be formed of a concavity, namely, a bottomed hole instead of the opening. Further, in a case where the insulating layer 25 is the light transmission layer, it can be formed of a material which includes a parent material, and particles which have a refractive index different from that of the parent material and which are dispersed in the parent material. With such a construction, the light transmission layer can be endowed with the function of scattering light.

Also, the insulating layer 25 can have the function of protecting the surface of the reflection layer 12 near the liquid crystal layer (that is, the reflection surface thereof). By way of example, in the case where the reflection layer 12 is formed of aluminum, silver or an alloy thereof, or the laminated films of aluminum, silver or an alloy thereof and titanium, titanium nitride, molybdenum, tantalum or the like, it can effectively function as a protective film.

The insulating layer 25 is overlaid with each transparent electrode 16 which is made of a transparent conductor such as ITO (Indium Tin Oxide). The electrode 16 is arranged at a position corresponding to the reflection portion 12r of the reflection layer 12, and it enters, at least, the opening 25a of the insulating layer 25, thereby having a concavity on the surface at a position corresponding to the transmission portion 12a of the reflection layer 12.

Each electrode 16 is formed in the shape of a band extending vertically on the drawing sheet of FIG. 3, and the plurality of electrodes 16 are arrayed in the shape of the stripes parallel to one another. Voltages can be applied to the portions of the display dots D of the liquid crystal layer 42 in FIG. 2 by employing the electrodes 16. An orientation film 17 made of a polyimide resin or the like is formed on the electrodes 16, and on those parts of the insulating layer 25 which correspond to regions not formed with the electrodes 16.

Referring to FIG. 4, each opening 25a of the insulating layer 25 is formed in the region which coincides with the corresponding transmission portion 12a of the reflection layer 12 in plane, and hence, a concave shape is defined by the transmission portion 12a of the reflection layer 12 and the opening 25a of the insulating layer 25 on the surface of the first base member 11. Also, since the electrodes 16 and the orientation film 17 are arranged so as to reproduce such concave parts, the concavities 10a are formed on the surface of the substrate for the liquid crystal device 10.

Structure of Opposing Substrate

On the other hand, the opposing substrate 20 which opposes the substrate for the liquid crystal device 10, includes a colored layer 14 which is disposed on the second base member 21 so as to coincide with the reflection layer 12 in plane, and which is covered with a surface protection layer, namely, an overcoat layer 15 made of a transparent resin such as acrylic resin or epoxy resin. Due to this construction, full color display of excellent contrast can be realized.

Each colored layer 14 preferably includes a coloring agent such as pigment or dye dispersed in a transparent resin so as to present a predetermined color tone. An example of the color tones of such colored layers 14 is the combination of the three colors of R (red), G (green) and B (blue) for primary color filters. However, the color tones are not restricted to the combination, and the colored layers can be formed in complementary colors or various other color tones.

Incidentally, the colored layers 14 are usually formed into a predetermined color pattern in such a way that a colored resist which is made of a photosensitive resin including the coloring agent such as pigment or dye is applied onto the surface of the second base member 21, whereupon its unnecessary parts are removed by photolithography. Here, the above step is repeated in the case of forming the colored layers 14 in the plurality of color tones.

Black light shield films 14BM are formed on the inter-dot regions among the colored layers 14 which are formed for the respective display dots D as stated above. The black light shield films 14BM are sometimes called a "black matrix", a "black mask" or the like. Usable for the black light shield films 14BM is, for example, a resin or any other base material in which a black coloring agent such as pigment or dye is dispersed, a resin or any other parent material in which all of coloring agents in the three colors of R (red), G (green) and B (blue) are dispersed, or a metal thin film of chromium or chromium oxide or laminated films consisting of the thin films.

Incidentally, although a stripe array is adopted as the array pattern of the colored layers 14 in the example shown in FIG. 3, any of various pattern shapes such as a delta array and an oblique mosaic array can be adopted alternatively to the stripe array.

Referring to FIG. 4, each transparent electrode 22 made of a transparent conductor such as ITO, and an orientation film 24 made of a polyimide resin or the like are further laminated on the resulting opposing substrate 20 in succession. The interval between the part of the orientation film 17 at the position thereof corresponding to the transmission portion 12a of the reflection layer 12 and the orientation film 24 on the side of the opposing substrate 20 is larger than the interval between the part of the orientation film 17 at the position thereof corresponding to the reflection portion 12r of the reflection layer 12 and the orientation film 24. In this way, the thickness "b" of the liquid crystal layer 42 at the position thereof corresponding to the transmission portion 12a of the reflection layer 12 can be made greater than the thickness "a" of the liquid crystal layer 42 at the position thereof corresponding to the reflection portion 12r of the reflection layer 12. Thus, the utilization efficiency of transmitted light in transmission type display can be increased without lowering the brightness of an image display in a reflection type display. The details of this functional effect will be stated later.

The transparent electrodes 22 on the opposing substrate 20, and the transparent electrodes 16 on the substrate for the liquid crystal device 10, are arranged so as to orthogonally intersect each other, and the points of the intersections are arrayed in the shape of a matrix as shown in FIGS. 2 and 3. Also, each of the matrix-shaped intersection points form one display dot D.

Structure of the Liquid Crystal Layer

Referring to FIG. 4, the interspace between the substrate for the liquid crystal device 10, and the opposing substrate 20 is filled up with the liquid crystal, thereby forming the liquid crystal layer 42. On this occasion, the surface of the substrate for the liquid crystal device 10, lying in contact with the liquid crystal layer 42 is formed with the concavity 10a every display dot D as stated before, so that the liquid crystal forming the liquid crystal layer 42 falls into a state where it enters the concavity 10a, i.e., a state where it enters the interior of the opening 25a of the insulating layer 25. Therefore, the thickness "b" of the liquid crystal layer 42 at the position thereof corresponding to the transmission portion 12a of the reflection layer 12 is greater than the thickness "a" of the liquid crystal layer 42 at the position thereof corresponding to the reflection portion 12r of the reflection layer 12.

Further, the thickness "a" of the liquid crystal layer 42 at the position thereof corresponding to the reflection portion 12r of the reflection layer 12, and the thickness "b" of the liquid crystal layer 42 at the position thereof corresponding to the transmission portion 12a of the reflection layer 12 should preferably be set so as to satisfy the relational formula of $1.8a \leq b \leq 2.4a$. In any condition which does not satisfy the relational formula, a transmission factor in each transmission portion 12a becomes less than 90%, so that the transmission type display in the transmission portion 12a darkens.

The liquid crystal device 1 in this embodiment is constructed as described above. In the case of presenting an image display by the reflection type display, therefore, external light entering from the side of the opposing substrate 20 passes through the opposing substrate 20 constructed of the colored layers 14, etc., as well as the liquid crystal layer 42, it is thereafter reflected from the reflection portions 12r, and the reflected light passes through the liquid crystal layer 42 as well as the opposing substrate 20 again so as to exit to the exterior. On this occasion, the reflected light has passed twice through the liquid crystal layer 42 between the opposing substrate 20 and the substrate for the liquid crystal device 10.

On the other hand, in the case of presenting an image display by the transmission type display, part of illuminating light from the LED 61 or the like of the illuminator 60 which is disposed on the rear side of the substrate for the liquid crystal device 10, passes through the transmission portions 12a of the reflection layer 12 and enters liquid crystal layer 42, and the transmitted light passes through the opposing substrate 20 constructed of the colored layers 14, etc. so as to exit to the exterior. On this occasion, the transmitted light passes through the liquid crystal layer 42 only once.

As stated above, when the liquid crystal forming the liquid crystal layer 42 enters the concavities 10a formed in the surface of the substrate for the liquid crystal device 10, on the side of the liquid crystal layer 42, the thickness of the liquid crystal layer 42 is greater in the regions thereof coinciding with the transmission portions 12a of the reflection layer 12. Therefore, the retardation ($\Delta n \cdot d$ where $\Delta n$ denotes the refractive index anisotropy of the liquid crystal layer, and d denotes the thickness of the liquid crystal layer) of the liquid crystal layer 42 acting on the transmitted light performing the transmission type display increases, with the result that the utilization efficiency of the transmitted light in the transmission type display can be heightened. That is, a bright transmission type display can be realized without lowering the brightness of the image display in the reflection type display.

Figure 5:
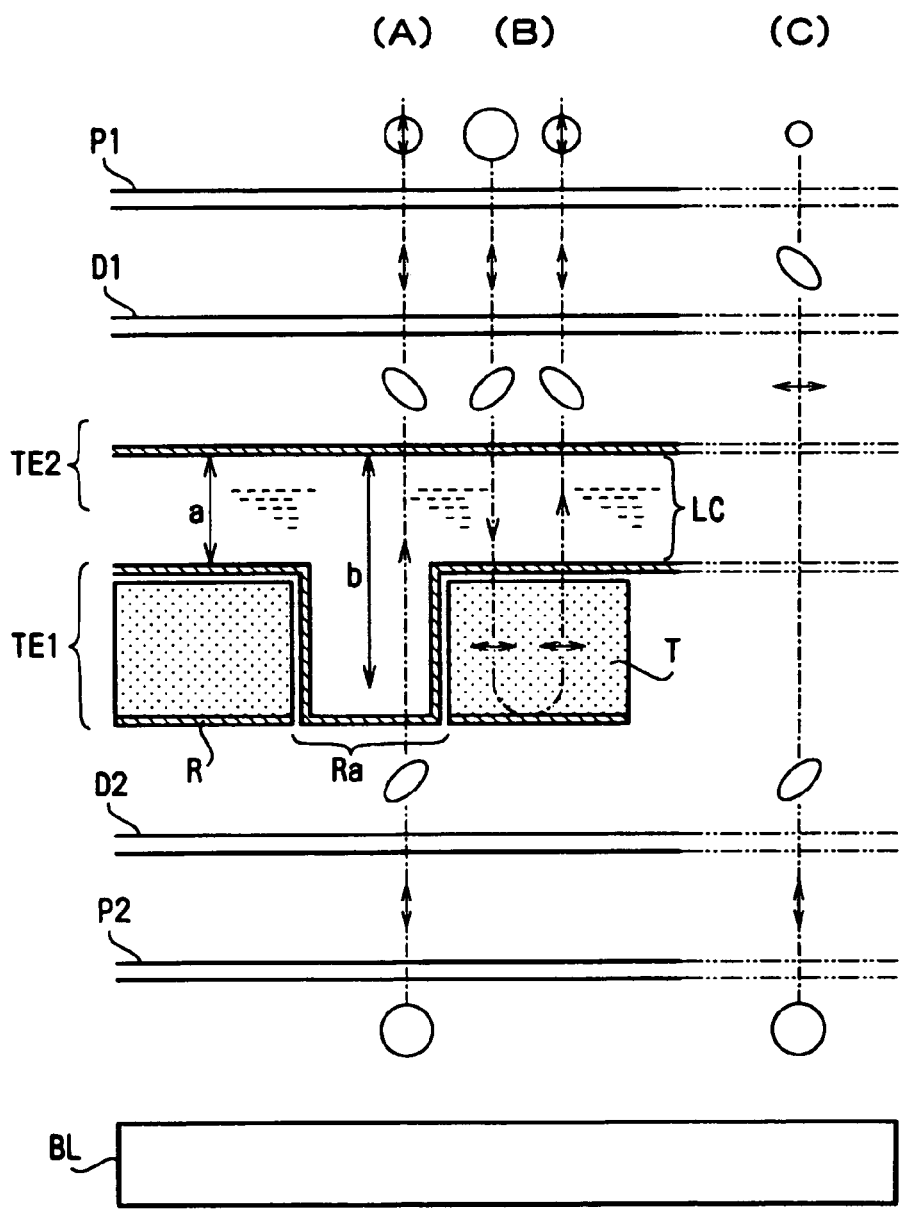
FIG. 5 is a diagram showing display principles in the liquid crystal device in FIG. 2.

FIG. 5 is a diagram for explaining the effect in the case where the thickness of the liquid crystal layer is changed as stated above. Referring to FIG. 5, as in the case of the liquid crystal device 1 shown in FIG. 4, a substrate for a liquid crystal device, TE1 is formed with an insulating layer T on a reflection layer R including each transmission portion Ra, so as to have an opening over the transmission portion Ra of the reflection layer R. A backlighting unit BL in the form of an illuminator is arranged on the rear of the substrate for the liquid crystal device, TE1.

On this occasion, it is assumed that the thickness "b" of a liquid crystal layer in the region thereof coinciding with the transmission portion Ra in plane be set double the thickness "a" of the liquid crystal layer in any other region. Here, in order to facilitate description, it is assumed that a nematic liquid crystal layer LC of homogeneous system be formed, and also that the retardation of the liquid crystal layer LC be $\Delta n \cdot a = \lambda/4$ or $\Delta n \cdot b = \lambda/2$ (where $\Delta n$ denotes the refractive index anisotropy of the liquid crystal layer LC, and $\lambda$ denotes the wavelength of light).

In the above situation, under the light transmission state of the liquid crystal layer LC, transmission type display is as shown at (A). Illuminating light from the backlighting unit BL passes through a polarization plate P2 and becomes linearly polarized light, and the polarized light passes through a phase difference plate (for example, a quarter wavelength plate) D2, thereby to become circularly polarized light in, for example, the clockwise direction. Since the circularly polarized light passes through the liquid crystal layer of the thickness "b", its phase difference is further increased a half wavelength, and the circularly polarized light becomes counterclockwise. The resulting circularly polarized light passes through an opposing substrate TE2 and then through a phase difference plate D1, whereby it becomes the original linearly polarized light by having its phase difference further increased a quarter wavelength. The resulting linearly polarized light passes through a polarization plate P1.

Besides, under the same light transmission state of the liquid crystal layer LC as explained above, a reflection type display is as shown at (B). External light passes through the polarization plate P1 and becomes linearly polarized light, and the polarized light passes through the phase difference plate (for example, quarter wavelength plate) D1, thereby to become circularly polarized light in, for example, the clockwise direction. Since the circularly polarized light passes through the liquid crystal layer of the thickness "a" twice in reciprocating fashion, its phase difference is further increased a half wavelength, and the circularly polarized light becomes counterclockwise. This circularly polarized light passes through the phase difference plate D1 again, to thereby be restored into the original linearly polarized light, which passes through the polarization plate P1.

Here, as shown at (C), in the transmission type display a case is supposed where light passes through the liquid crystal layer of the thickness "a" (that is, half of the thickness "b" of the liquid crystal layer shown at (A)). Then, the retardation of the liquid crystal layer LC becomes $\lambda/4$. Therefore, after the illuminating light passes through the liquid crystal layer LC via the polarization plate P2 and the phase difference plate D2, it becomes linearly polarized light in a direction orthogonal to the original direction. Thereafter, the linearly polarized light passes through the phase difference plate D1 and becomes circularly polarized light in the counterclockwise direction. Further, the circularly polarized light passes through the polarization plate P1. On this occasion, a polarized light component which can pass through the polarization plate P1 becomes approximately half of the polarized light component of the transmission type display shown at (A).

As described above, in the case of the liquid crystal device of a semitransmissive reflection type as in this embodiment, when the thickness "b" of the liquid crystal layer in the region thereof coinciding with the transmission portion Ra of the reflection layer R in plane is greater than the thickness "a" of the liquid crystal layer in the other region thereof, a light transmission factor in the light transmission state heightens. Especially, when the thickness "b" of the liquid crystal layer in the region thereof coinciding with the transmission portion Ra in plane is approximately double the thickness "a" of the liquid crystal layer in the other region thereof, also the quantity of light transmission becomes approximately double.

Also, letting $\Delta n \cdot a$ denote the product between the refractive index anisotropy $\Delta n$ of the nematic liquid crystal forming the liquid crystal layer and the thickness "a" of the liquid crystal layer corresponding to the position of the reflection portion, and $\Delta n \cdot b$ denote the product between the refractive index anisotropy $\Delta n$ and the thickness "b" of the liquid crystal layer corresponding to the position of the transmission portion Ra, the liquid crystal device is constructed so as to satisfy the following relational formula:

$$1.8\Delta n \cdot a \leq \Delta n \cdot b \leq 2.4\Delta n \cdot a$$

whereby a transmission factor in the transmission portion Ra in the case of performing the transmission type display can be made 90% or above, so a bright transmission display can be presented.

In a case where the liquid crystal layer LC is not of the homogeneous system, but where a twist exists in the liquid crystal layer LC, the transmission factor sometimes fails to be enhanced. With a liquid crystal of, for example, 40° twist, however, the transmission factor can be enhanced to about 40% when the thickness "b" of the liquid crystal layer in the region thereof coinciding with the transmission portion Ra in plane is set double the thickness of the liquid crystal layer in the other region thereof.

According to this construction, the utilization efficiency of transmitted light for the transmission type display can be enhanced to brighten the transmission type display. By way of example, therefore, the quantity of the illuminating light of the backlighting unit or the like can be decreased, so that reducing the size of the backlighting unit, thinning the structure thereof, reducing the weight thereof and lowering the power consumption thereof can be achieved. Moreover, if the brightness of the transmission type display is sufficiently ensured, the area of the reflection portion is increased by reducing the open area of each transmission portion Ra, whereby the brightness of the reflection type display can be enhanced.

Also, the insulating layer 25 in FIG. 4 can be utilized as a resist mask when the transmission portions 12a of the reflection layer 12 are formed, so that the prior-art manufacturing process of the substrate for the liquid crystal device 10, is not complicated. Incidentally, a method of manufacturing, the substrate for the liquid crystal device 10, will be described later.

Second Embodiment

Figure 6:
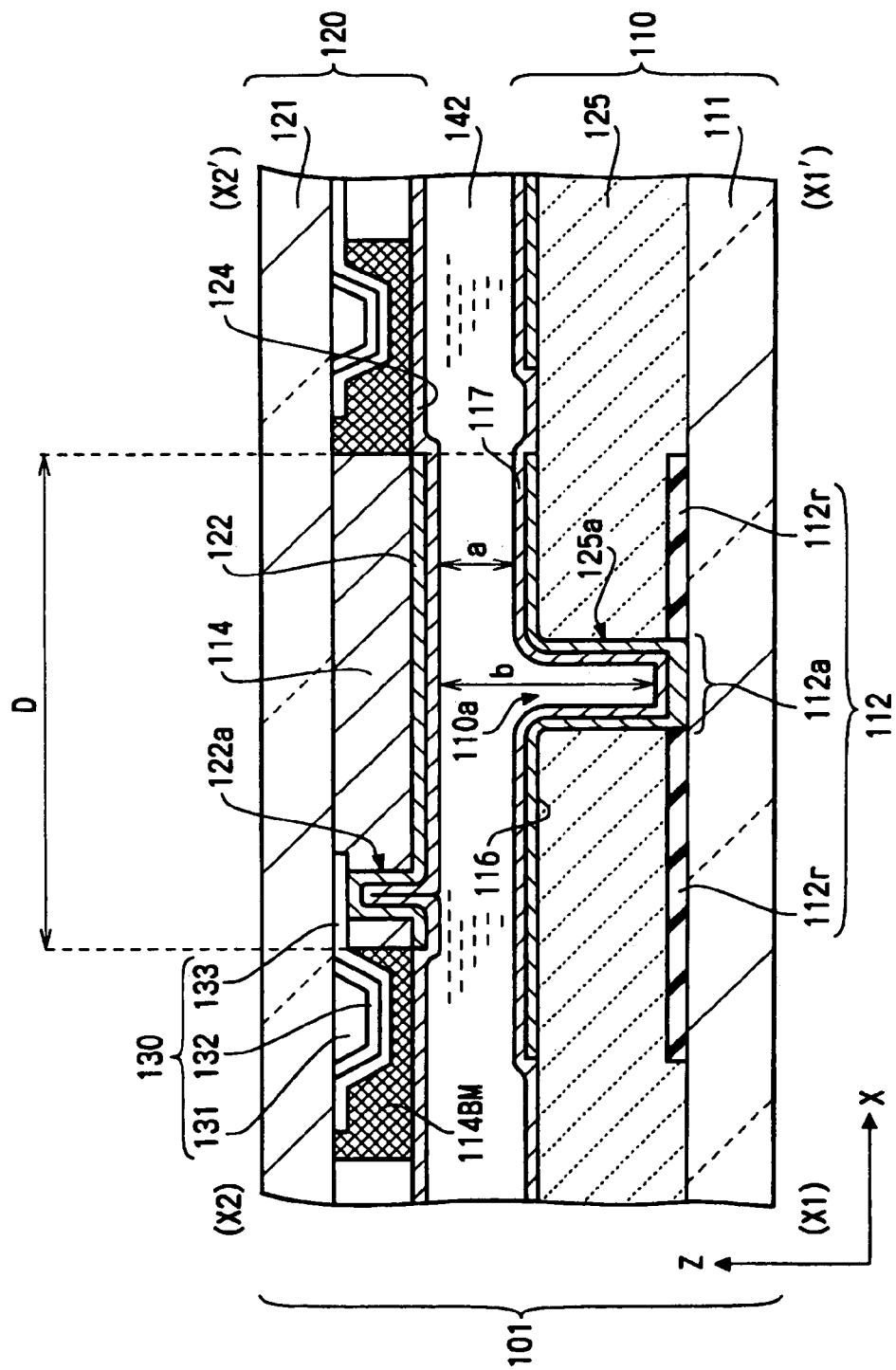
FIG. 6 is a sectional view showing the sectional structure of one display dot portion of a liquid crystal device which is another embodiment of the electrooptic device according to the present invention, and taken along line X1–X1' in FIG. 7 and line X2–X2' in FIG. 8.
Figure 7:
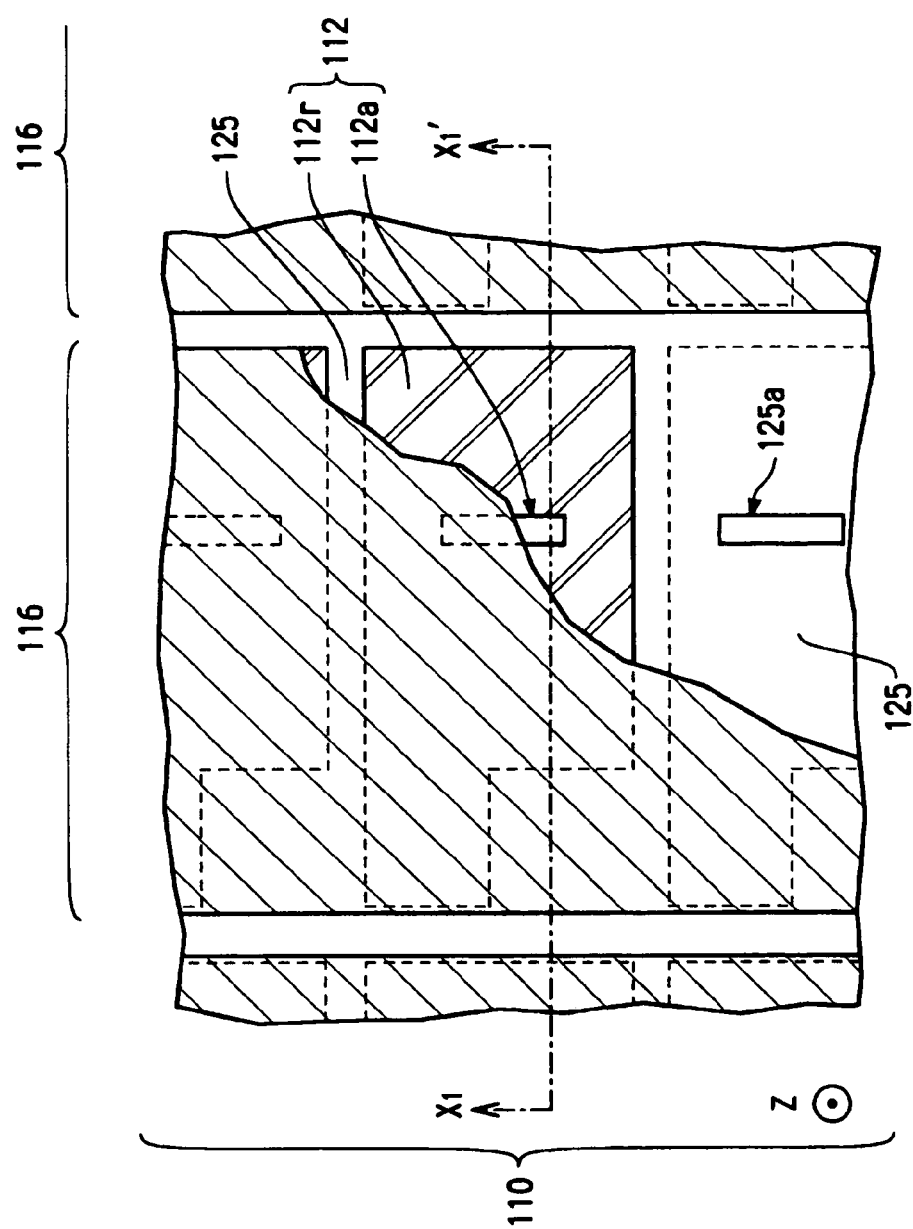
FIG. 7 is a plan view in which a substrate for the liquid crystal device shown in FIG. 6 is seen in the positive direction of a Z-axis in FIG. 6.
Figure 8:
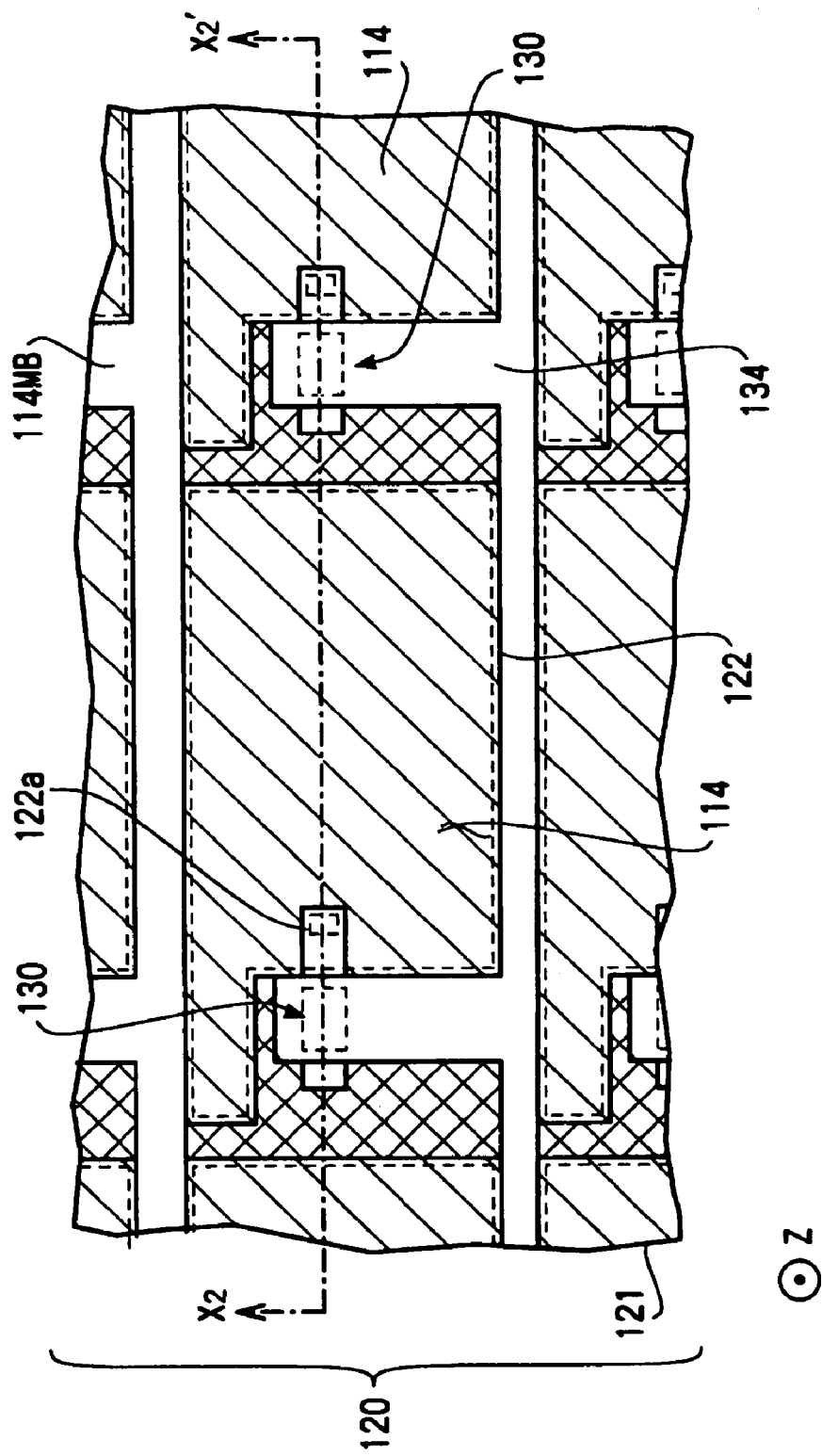
FIG. 8 is a plan view in which an opposing substrate constituting the liquid crystal device shown in FIG. 6 is seen in the positive direction of the Z-axis in FIG. 6.

Next, a liquid crystal device which is another embodiment of the electrooptic device according to the present invention will be described with reference to FIGS. 6 through 8. FIG. 6 shows the sectional structure of the principal portions of the liquid crystal device 101. FIG. 7 is a plan view in which a substrate for the liquid crystal device as constitutes the liquid crystal device 101 is seen in the plus direction of a Z-axis in FIG. 6. FIG. 8 is a plan view in which an opposing substrate constituting the liquid crystal device 101 is seen in the plus direction of the Z-axis in FIG. 6. Incidentally, FIG. 6 is a sectional view taken along-line X1–X1' in FIG. 7 and line X2–X2' in FIG. 8.

The liquid crystal device 101 is a liquid crystal device of active matrix scheme employing TFD (Thin Film Diode) elements as active elements. Referring to FIG. 6, the opposing substrate 120 is provided with each transparent electrode 122 which is arranged so as to coincide with a corresponding colored layer 114 in plane, and the corresponding TFD element 130 being the active element which functions as a switching element connected to the transparent electrode 122. Due to this construction, power consumption can be lowered, and reduction in the size of the liquid crystal device can be realized.

As shown in FIGS. 6 and 7, in the substrate for the liquid crystal device 110, a reflection layer 112 which includes each reflection portion 112r and each transmission portion 112a is formed on a first base member 111 and an insulating layer 125 is formed on the reflection layer 112. An opening 125a, namely, a through hole is formed in the insulating layer 125 so as to coincide with the transmission portion 112a of the reflection layer 112.

Also, a transparent electrode 116 which functions as a scanning line is formed on the insulating layer 125 so as to cover a region where the reflection layer 112 is formed. Further, an orientation film 117 is formed on, at least, the transparent electrode 116 and the parts of the insulating layer 125 corresponding to regions where the transparent electrode 116 is not formed. The reflection layer 112, insulating layer 125, transparent electrode 116 and orientation film 117 are formed of the same raw materials as used in the embodiment shown in FIG. 4.

As shown in FIGS. 6 and 8, the opposing substrate 120 is a color filter array substrate which includes each colored layer 114 and the corresponding TFD element 130, and in which the TFD element 130 is formed on a second base member 121. The TFD element 130 is constructed of a first metal layer 131, an insulating layer 132 formed on the surface of the first metal layer 131, and a second metal layer 133 formed on the insulating layer 132. In this manner, the TFD element 130 is constructed of a multilayered structure or a so-called "MIM (Metal Insulator Metal) structure" which is made up of the first metal layer 131/insulating layer 132/second metal layer 133.

Also, a signal line 134 for feeding a pixel signal is formed on the second base member 121 so as to intersect with the transparent electrode 116 formed on the first base member 111, in plane. This signal line 134 is electrically connected with the corresponding TFD elements 130.

The first metal layer 131 constituting the TFD element 130 is formed of, for example, the simple substance of tantalum, an alloy of tantalum, or the like. In case of employing the tantalum alloy as the first metal layer 131, the tantalum being a main ingredient is doped with a predetermined element, for example, an element which belongs to any of groups-6 through 8 of the periodic table, such as tungsten, chromium, molybdenum, rhenium, yttrium, lanthanum or dysprosium.

The insulating layer 132 is formed of tantalum oxide ($Ta_2O_3$) which is produced by oxidizing the surface of the first metal layer 131 by, for example, anodic oxidation, and it is further overlaid with the second metal layer 133 by using a conductive material, for example, chromium.

The second base member 121 thus formed with the TFD elements 130 is further overlaid with the colored layers 114 for respective display dots D. Besides, black light shield films 114BM which are a so-called "black matrix" or "black mask" are formed on the inter-dot regions among the colored layers 114. In this embodiment, "one display dot" is defined as a region where one transparent electrode 122 on the second base member 121 and the corresponding transparent electrode 116 on the first base member 111 overlap each other when viewed in plane. Besides, the colored layers 114 and the black light shield films 114BM are formed of the same materials as used in the embodiment shown in FIG. 3.

The transparent electrode 122 made of a transparent conductor such as ITO, and an orientation film 124 made of a polyimide resin or the like are successively laminated on the surface of the colored layer 114. Further, the transparent electrode 122 is electrically connected with the TFD element 130 through a contact hole 122a. The orientation film 124 is formed on, at least, the transparent electrode 122, the part of the colored layer 114 corresponding to a region where the transparent electrode 122 is not formed, and the black light shield film 114BM.

The interspace between the substrate for the liquid crystal device 110 and the opposing substrate 120 is filled up with a liquid crystal, thereby to form a liquid crystal layer 142. The liquid crystal forming the liquid crystal layer 142 lies in a state where it enters a concavity 110a formed in the surface of the substrate for the liquid crystal device 110 on the side of the liquid crystal layer 142 (that is, a state where it enters, at least, the interior of the opening 125a of the insulating layer 125). On this occasion, the thickness "a" of the liquid crystal layer 142 at the position thereof corresponding to the reflection portion 112r of the reflection layer 112, and the thickness "b" of the liquid crystal layer 142 at the position thereof corresponding to the transmission portion 112a should preferably be set so as to satisfy the following relational formula:

$$1.8a \leq b \leq 2.4a$$

Also, letting $\Delta n \cdot a$ denote the product between the refractive index anisotropy $\Delta n$ of the nematic liquid crystal forming the liquid crystal layer 142 and the thickness "a" of the liquid crystal layer at the position thereof corresponding to the reflection portion 112r, and $\Delta n \cdot b$ denote the product between the refractive index anisotropy $\Delta n$ and the thickness "b" of the liquid crystal layer at the position thereof corresponding to the transmission portion 112a, the products should preferably be set so as to satisfy the following relational formula:

$$1.8\Delta n \cdot a \geq \Delta n \cdot b \leq 2.4\Delta n \cdot a$$

Due to this construction, the same functional effect as that of the embodiment shown in FIG. 3 can be attained, and the utilization efficiency of transmitted light in transmission type display can be heightened without lowering the brightness of an image display in a reflection type display.

Moreover, in this embodiment, the TFD element 130 is not formed on the first base member 111 formed with the reflection layer 112, so that the manufacturing process of the substrate for the liquid crystal device 110 can be simplified as compared with a manufacturing process in the case of forming the TFD element 130 on the first base member 111 formed with the reflection layer 112. Also, the colored layer 114 and the black light shield film 114BM are formed on the second base member 121 formed with the TFD element 130, so that the influence of miss-assembly involved when the opposing substrate 120 and the substrate for the liquid crystal device 110 are held to each other can be mitigated as compared with the influence in the case of forming the colored layer 114 and the black light shield film 114BM on a substrate separate from the TFD element 130.

Third Embodiment

Figure 9:
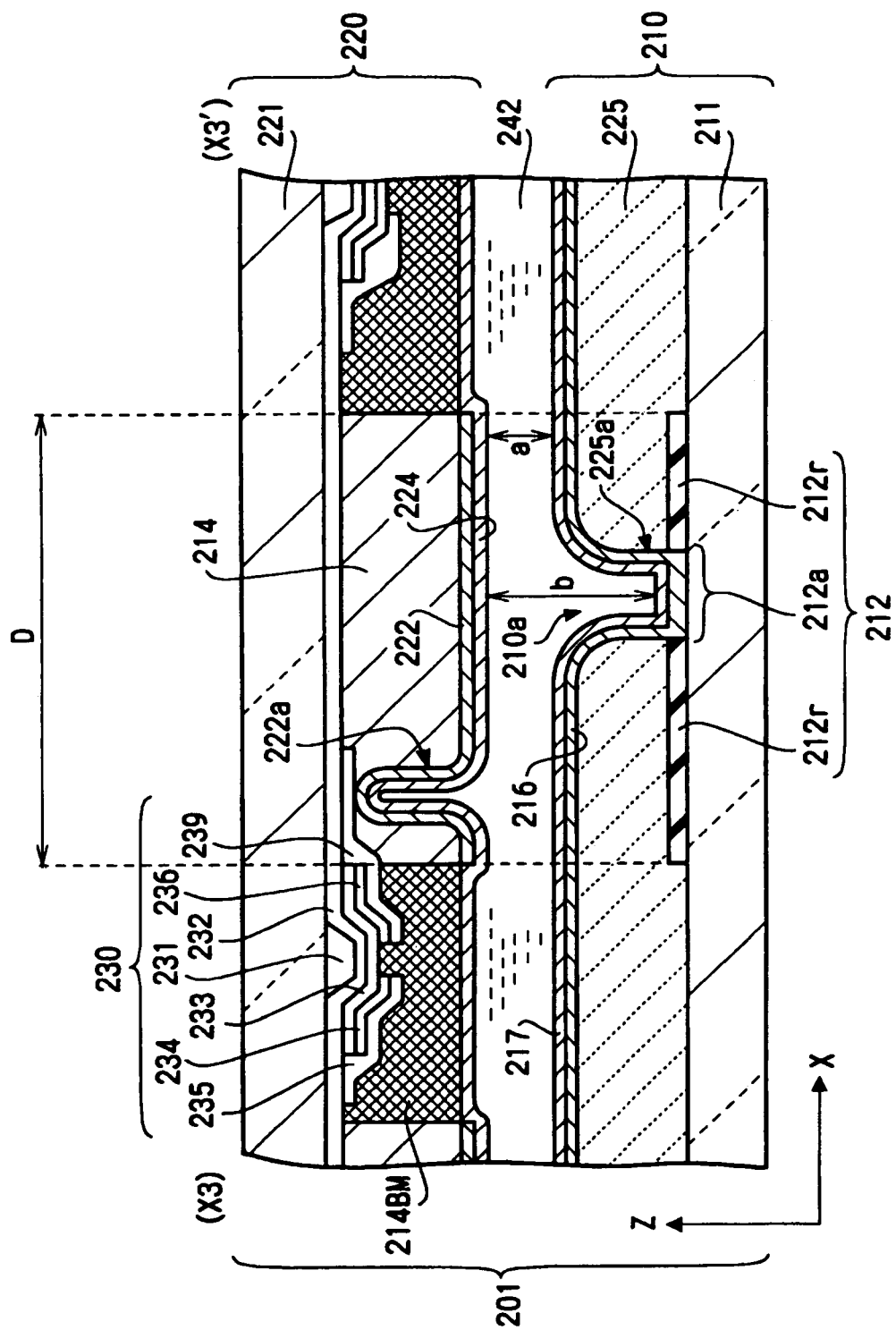
FIG. 9 is a sectional view showing the sectional structure of one display dot portion of a liquid crystal device which is still another embodiment of the electrooptic device according to the present invention, and taken along line X3–X3' in FIG. 10.
Figure 10:
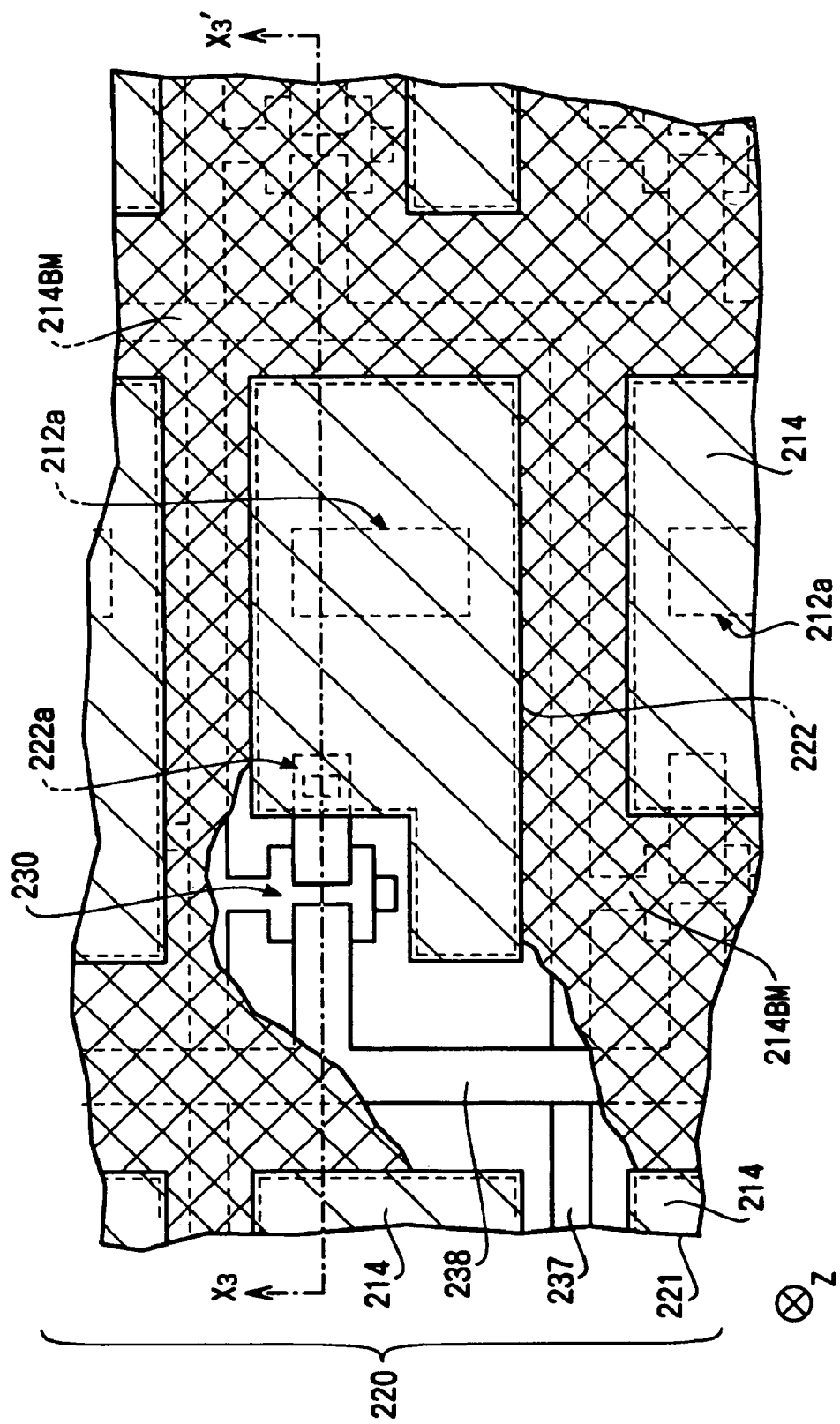
FIG. 10 is a plan view in which an opposing substrate constituting the liquid crystal device shown in FIG. 9 is seen in the negative direction of a Z-axis in FIG. 9.

Next, a liquid crystal device which is another embodiment of the electrooptic device according to the present invention will be described with reference to FIGS. 9 and 10. FIG. 9 shows the sectional structure of the principal portions of the liquid crystal device 201. FIG. 10 shows a plane structure in the case where an opposing substrate 220 constituting the liquid crystal device 201 is seen in the minus direction of a Z-axis in FIG. 9. The opposing substrate 220 is sometimes called the "color filter array substrate". Incidentally, FIG. 9 is a sectional view taken along line X3–X3' in FIG. 10. This embodiment is the liquid crystal device of active matrix scheme in which TFT (Thin Film Transistor) elements 230 being active elements of 3-terminal type are employed as the active elements.

Referring to FIG. 9, the opposing substrate 220 is the color filter array substrate provided with each transparent electrode 222 which is arranged so as to coincide with a corresponding colored layer 214 in plane, and a switching element which is connected to the transparent electrode 222. Also, the TFT element 230 being the active element which functions as the switching element is formed on a second base member 221.

Each TFT element 230 includes a gate electrode 231 which is formed on the second base member 221, a gate insulating film 232 which is formed on the whole surface of the resulting second base member 221 formed with the gate electrode 231, a semiconductor layer 233 which is formed over the gate electrode 231 with the gate insulating layer 232 interposed therebetween, a source electrode 235 which is formed on one side of the semiconductor layer 233 through a contact electrode 234, and a drain electrode 239 which is formed on the other side of the semiconductor layer 233 through a contact electrode 236.

The gate electrode 231 is formed so as to extend from a gate bus wiring line 237, while the source electrode 235 is formed so as to extend from a source bus wiring line 238. Referring to FIG. 10, each gate bus wiring line 237 extends in the lateral direction of the base member 221, and a plurality of such gate bus wiring lines 237 are formed in parallel at equal vertical intervals. Also, each source bus wiring line 238 extends in the vertical direction of the base member 221 so as to orthogonally intersect with the gate bus wiring line 237 with the gate insulating film 232 interposed therebetween, and a plurality of such source bus wiring lines are formed in parallel at equal lateral intervals.

The gate bus wiring line 237 and the gate electrode 231 are formed of, for example, chromium or tantalum. The gate insulating film 232 is formed of, for example, silicon nitride (SiN) or silicon oxide ($SiO_x$). The semiconductor layer 233 is formed of, for example, A-Si, polycrystalline silicon or CdSe. The source electrode 235 as well as the source bus wiring line 238 unitary therewith, and the drain electrode 239 are formed of, for example, titanium, molybdenum or aluminum. The gate bus wiring line 237 functions as a scanning line, while the source bus wiring line 238 functions as a signal line.

The second base member 221 formed with the TFT elements 230 is further overlaid with the colored layers 214 for respective display dots D, and black light shield films 214BM are formed on the inter-dot regions among the colored layers 214. The black light shield films 214BM are also called the "black matrix" or "black mask". In this embodiment, "one display dot D" is defined by a region where one transparent electrode 222 on the second base member 221 and the corresponding transparent electrode 216 on the first base member 211 overlap each other when viewed in plane. The colored layers 214 and the black light shield films 214BM are formed of the same materials as used in the embodiment shown in FIG. 4.

The transparent electrode 222 made of a transparent conductor such as ITO, and an orientation film 224 made of a polyimide resin or the like are successively laminated on the surface of the colored layer 214. Further, the transparent electrode 222 is electrically connected with the TFT element 230 through a contact hole 222a.

In a substrate for the liquid crystal, 210, as in the case of the embodiment in FIG. 4, a reflection layer 212 which includes each reflection portion 212r and each transmission portion 212a is formed on a first base member 211, and an insulating layer 225 is formed on the reflection layer 212. Further, a transparent electrode 216 and an orientation film 217 are successively formed on the insulating layer 225. Besides, an opening, namely, a through hole 225a is formed in the insulating layer 225 so as to coincide with the transmission portion 212a of the reflection layer 212. The reflection layer 212, insulating layer 225, transparent electrode 216 and orientation film 217 are formed of the same materials as used in the embodiment in FIG. 4.

The interspace between the substrate for the liquid crystal device 210 and the opposing substrate 220 is filled up with a liquid crystal, thereby forming a liquid crystal layer 242. The liquid crystal forming the liquid crystal layer 242 lies in a state where it enters a concavity 210a formed in the surface of the substrate for the liquid crystal device 210 on the side of the liquid crystal layer 242, that is, a state where it enters, at least, the interior of the opening 225a of the insulating layer 225.

On this occasion, the thickness "a" of the liquid crystal layer 242 at the position thereof corresponding to the reflection portion 212r of the reflection layer 212, and the thickness "b" of the liquid crystal layer 242 at the position thereof corresponding to the transmission portion 212a should preferably be set so as to satisfy the following relational formula:

$$1.8a \leq b \leq 2.4a$$

Also, letting $\Delta n \cdot a$ denote the product between the refractive index anisotropy $\Delta n$ of the nematic liquid crystal forming the liquid crystal layer 242 and the thickness "a" of the liquid crystal layer corresponding to the position of the reflection portion 212r, and $\Delta n \cdot b$ denote the product between the refractive index anisotropy $\Delta n$ and the thickness "b" of the liquid crystal layer corresponding to the position of the transmission portion 212a, the products should preferably be set so as to satisfy the following relational formula:

$$1.8\Delta n \cdot a \leq \Delta n \cdot b \leq 2.4\Delta n \cdot a$$

Due to this construction, the same functional effect as in the case of the embodiment in FIG. 4 can be attained, and the utilization efficiency of transmitted light in transmission type display can be heightened without lowering the brightness of an image display in a reflection type display. Also in this embodiment, the same functional effect as in the case of the embodiment in FIG. 6 can be attained. That is, since the TFT element 230 is not formed on the first base member 211 formed with the reflection layer 212, the manufacturing process of the substrate for the liquid crystal device 210 can be simplified as compared with a manufacturing process in the case of forming the TFT element 230 on the first base member 211 formed with the reflection layer 212.

Besides, the colored layer 214 and the black light shield film 214BM are formed on the second base member 221 formed with the TFT element 230, so that the influence of miss-assembly involved when the opposing substrate 220 and the substrate for the liquid crystal device 210 are held to each other can be mitigated as compared with the influence in the case of forming the colored layer 214 and the black light shield film 214BM on a substrate separate from the TFT element 230.

Fourth Embodiment

Next, an embodiment of a method of manufacturing a substrate for an electrooptic device according to the present invention will be described by exemplifying a method of manufacturing a substrate for a liquid crystal device, with reference to FIGS. 11(a)–(f). This embodiment relates to a method of manufacturing the substrate for the liquid crystal device 10 for use in the liquid crystal device 1 shown in FIG. 4.

Figure 11:
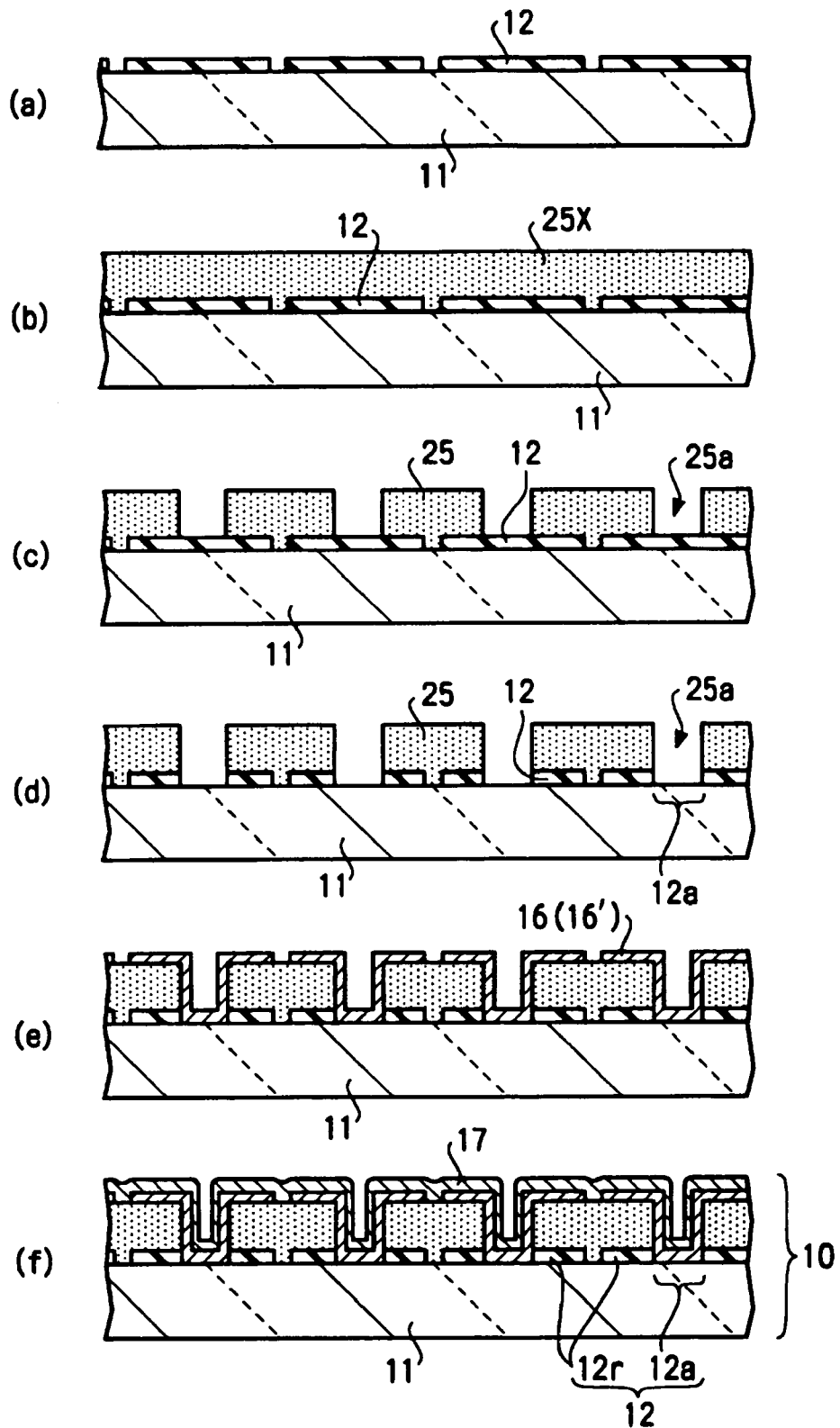
FIGS. 11a–11f are a process chart showing an embodiment of a method of manufacturing a substrate for an electrooptic device according to the present invention.

First, as shown in FIG. 11(a), aluminum, silver or an alloy thereof, or the aluminum, silver or alloy thereof and a metal such as titanium, titanium nitride, molybdenum or tantalum, is/are formed into the shape of a thin film on a first base member 11 by evaporation, sputtering or the like, and the thin film is patterned by employing known photolithography. Thus, a reflection layer 12 which is partitioned for respective display dots and which is about 50 nm–250 nm thick is formed.

Subsequently, as shown in FIG. 11(b), an insulating film 25X which is about 0.5 μm–2.5 μm thick is formed on the whole area of the reflection layer 12. Usable as the parent material of the insulating film 25X is an inorganic material such as $SiO_2$ or $TiO_2$ or an organic resin such as acrylic resin or epoxy resin. Also, the insulating layer 25X may well be formed using a material which is so prepared that particles having a refractive index different from that of the parent material such as organic resin are dispersed in the parent material. Due to this construction, in case of the image display of reflection type display, appropriate scattering can be caused, thereby preventing a face or the like from being mirrored on a display screen.

Subsequently, as shown in FIG. 11(c), the insulating film 25X (refer to FIG. 11(b)) is patterned by a photolithographic technique and an etching technique so that openings 25a may be arranged over regions corresponding to the transmission portions 12a of the reflection layer 12 to be stated below, whereby an insulating layer 25 is formed.

Subsequently, as shown in FIG. 11(d), the reflection layer 12 is etched by employing the insulating layer 25 as a resist mask, whereby the reflection layer 12 is provided with openings or through holes so as to form the transmission portions 12a. In case of an ordinary etching step, a resist mask is removed by an ashing step, etc. after the etching step has ended. In this embodiment, however, such steps can be omitted because the openings are formed in the reflection layer 12 by exposing this reflection layer 12 to light with the insulating layer 25 employed as the mask.

Subsequently, as shown in FIG. 11(e), a transparent conductive layer 16' made of a transparent conductor such as ITO is formed on the whole area of the resulting base member 11. The transparent conductive layer can be formed by sputtering. Besides, the transparent conductive layer is patterned by employing a photolithographic technique and an etching technique, whereby transparent electrodes 16 are formed.

Subsequently, as shown in FIG. 11(f), an orientation film 17 made of a polyimide resin or the like is formed on the whole area of the resultant first base member 11, and the orientation film 17 is subjected to a rubbing treatment. In this way, a substrate for a liquid crystal device 10 is formed.

Modified Embodiment 1

Next, a modified embodiment of the liquid crystal device 1 shown in FIG. 4 will be described with reference to FIGS. 12 and 13. Since this modified embodiment is constructed similarly to the liquid crystal device 1 in FIG. 4, except a substrate for a liquid crystal device 310 as shown in FIG. 12, similar portions shall be assigned the same signs and omitted from description.

Figure 12:
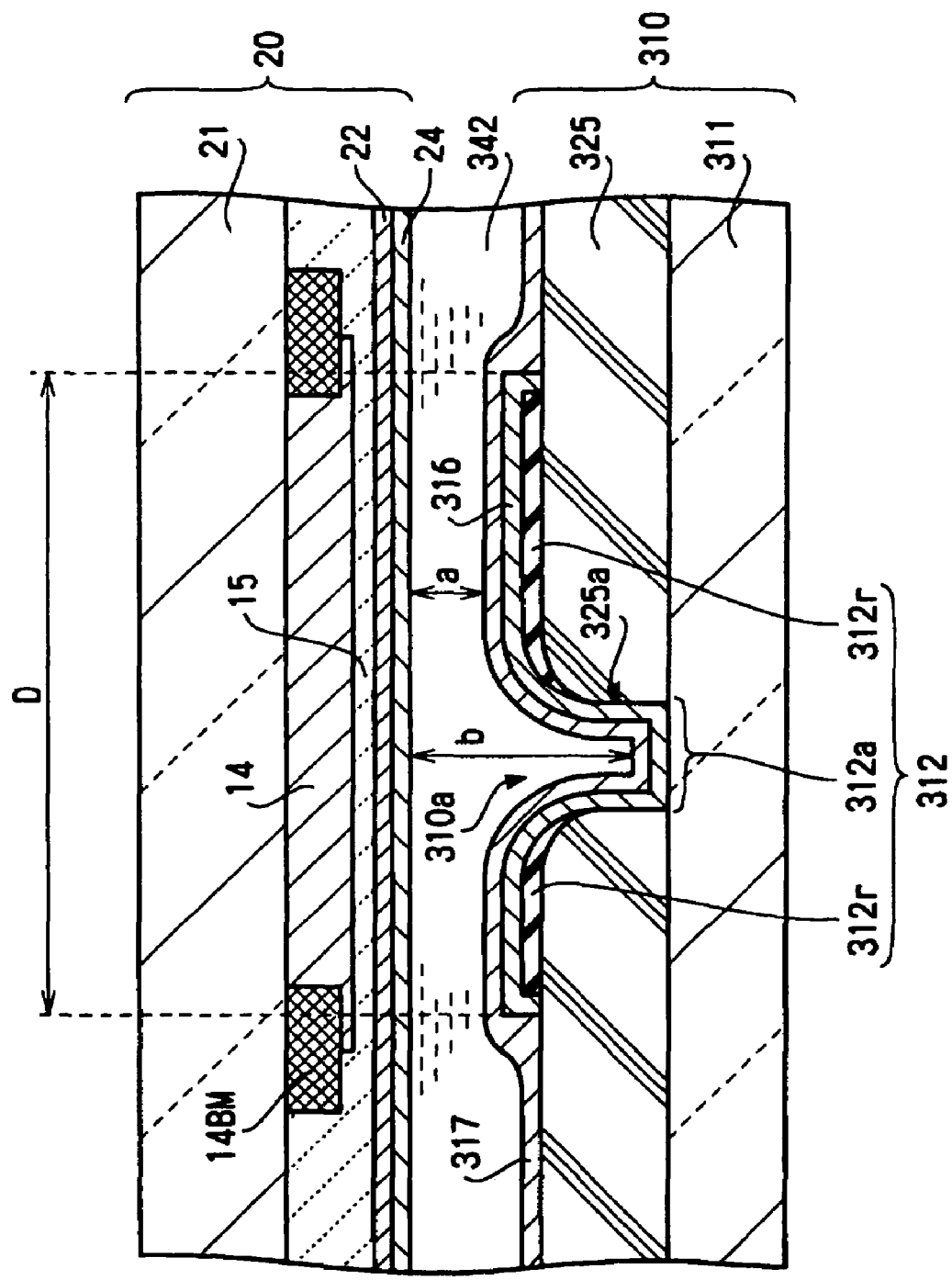
FIG. 12 is a sectional view showing the sectional structure of one display dot portion of a liquid crystal device which is still another embodiment of the electrooptic device according to the present invention.
Figure 13:
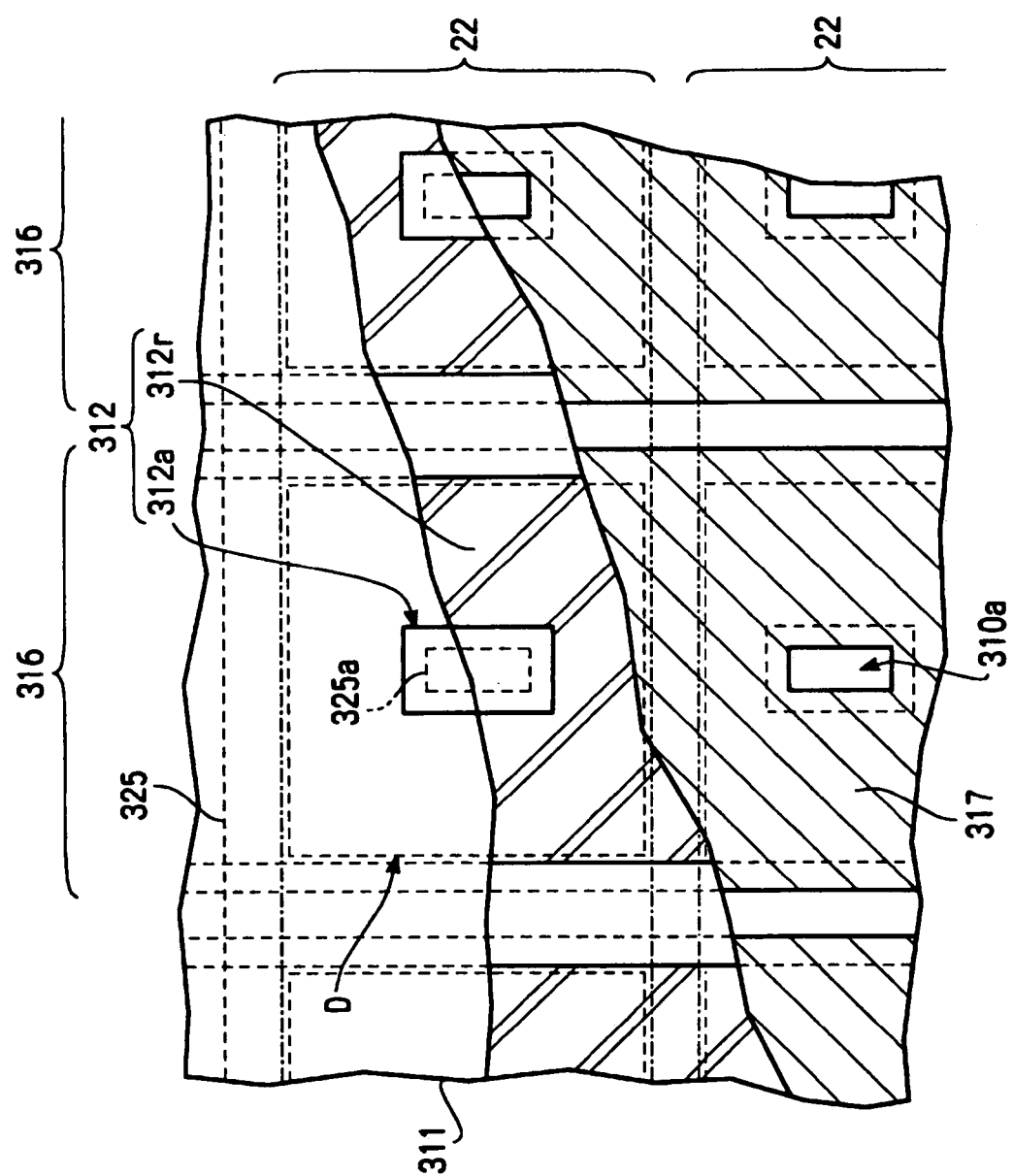
FIG. 13 is a plan view showing a substrate for the liquid crystal device in FIG. 12.

In this modified embodiment, as shown in FIGS. 12 and 13, an underlayer 325 is formed on the surface of a first base member 311 by using an inorganic material such as $SiO_2$ or $TiO_2$, an organic resin such as acrylic resin or epoxy resin, or the like. The underlayer 325 has every display dot D a transmission portion 325a which is defined by an opening or a through hole. Besides, the underlayer 325 should preferably be, for example, an insulating layer having an insulating property. Also in this modified embodiment, transparent electrodes 22 on an opposing substrate 20 and transparent electrodes 316 on the substrate for the liquid crystal device 310 are arranged so as to orthogonally intersect with each other, the points of the intersections are arrayed in the shape of a matrix, and each of the matrix-shaped intersection points forms one display dot D.

A reflection layer 312 is formed on the underlayer 325, and each reflection portion 312r and each transmission portion 312a adapted to transmit light are provided in the reflection layer 312. The transmission portion 312a is formed as an opening or a through hole. Besides, the transmission portion 312a is formed so as to coincide with the opening 325a of the underlayer 325. The reflection layer 312 is formed of aluminum, silver or an alloy thereof, or laminated films of the aluminum, silver or alloy thereof and titanium, titanium nitride, molybdenum, tantalum or the like.

Besides, the underlayer 325 should preferably have unevenness (not shown) in its surface on the side of the reflection layer 312, in regions other than regions corresponding to the transmission portions 312a of the reflection layer 312. When the unevenness is provided in the surface of the underlayer 325, unevenness is also formed in the surface of each reflection portion 312r of the reflection layer 312 which is stacked on the underlayer 325. Thus, in case of the image display of reflection type display, appropriate scattering can be caused, thereby to prevent a face or the like from being mirrored on a display screen.

Each transparent electrode 316 made of a transparent conductor such as ITO is formed on the reflection layer 312. Also, an orientation film 317 made of a polyimide resin or the like is formed on the transparent electrode 316. The transparent electrode 316 is formed so as to cover a corresponding end part of the reflection layer 312. This is effective to favorably perform etching in case of patterning in the layer structure in which the reflection layer 312 is formed of the aluminum, silver or alloy thereof, or the laminated films of the aluminum, silver or alloy thereof and the titanium, titanium nitride, molybdenum, tantalum or the like, and in which the ITO or the like is stacked on the reflection layer 312.

Each transparent electrode 316 is formed in the shape of a band extending vertically on the drawing sheet of FIG. 13, and the plurality of transparent electrodes 316 are formed in the shape of the stripes in parallel to one another. Besides, the transparent electrode 316 is arranged in correspondence with the position of the reflection portion 312r of the reflection layer 312, and it enters, at least, the opening 325a of the underlayer 325. Thus, a concavity 310a is formed in the surface of the underlayer 325 at the position thereof corresponding to the transmission portion 312a of the reflection layer 312. Due to this construction, bright image display of transmission type can be realized by effectively utilizing each opening 325a of the underlayer 325.

In the liquid crystal device thus constructed, each concavity 310a is formed in the surface of the substrate for the liquid crystal device 310 on the side of a liquid crystal layer 342, and a liquid crystal forming the liquid crystal layer 342 enters the concavity 310a. Thus, the thickness of the liquid crystal layer 342 becomes thicker in the region thereof coinciding with the transmission portion 312a of the reflection layer 312. Therefore, the same effect as that of the embodiment in FIG. 4 can be attained. Moreover, according to this embodiment, light does not pass through the underlayer 325 in reflection type display, so that the loss of a light quantity involved when the light is transmitted through the underlayer 325 can be avoided. Thus, the reflection factor of the reflection type display can be further enhanced.

Incidentally, the modified embodiment in FIG. 12 is applicable, not only to the liquid crystal device of passive matrix scheme as shown in FIG. 4, but also to the liquid crystal device of active matrix scheme having the TFD elements as shown in FIG. 6, or to the liquid crystal device of active matrix scheme having the TFT elements as shown in FIG. 9. Also, the TFD elements, the TFT elements or the likes may well be formed on the first base member which is provided with the reflection layer.

Modified Embodiment 2

Next, another modified embodiment of a liquid crystal device will be described with reference to FIG. 14. Since this modified embodiment is constructed similarly to the embodiment shown in FIG. 4, except an opposing substrate 420, similar portions shall be assigned the same signs and omitted from description.

Figure 14:
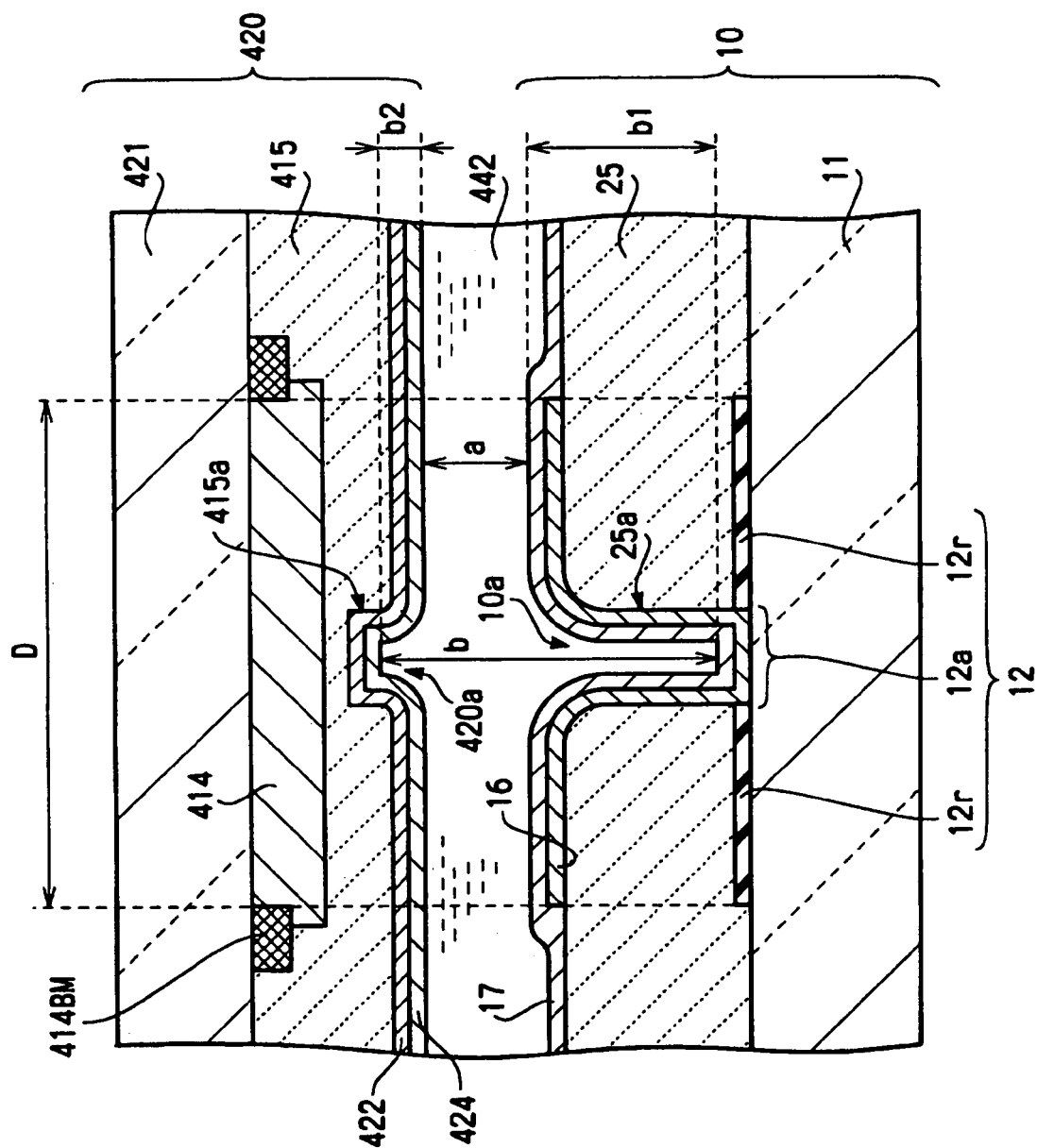
FIG. 14 is a sectional view showing one display dot portion of a liquid crystal device which is still another embodiment of the electrooptic device according to the present invention.

Referring to FIG. 14, a colored layer 414 is formed on the surface of a second base member 421 every display dot D, and black light shield films 414BM are formed on the inter-dot regions among such colored layers 414. The black light shield films 414BM are also called the "black matrix" or "black mask". The black light shield films 414BM are covered with a surface protection layer 415 which is made of a transparent resin such as acrylic resin or epoxy resin.

On the liquid crystal layer side of the surface protection layer 415, each concavity 415a is formed in the region thereof corresponding to the transmission portion 12a of a reflection layer 12 on a substrate for the liquid crystal device 10 which is arranged in opposition to the second base member 421.

Each transparent electrode 422 made of a transparent conductor such as ITO is formed on the surface protection layer 415, and an orientation film 424 made of a polyimide resin or the like is formed on such transparent electrodes 422. The concavity 415a of the surface protection layer 415 is reproduced in the surface of the orientation film 424, whereby the opposing substrate 420 has a concavity 420a in its surface. The transparent electrodes 422 on the opposing substrate 420 and transparent electrodes 16 on the substrate for the liquid crystal device 10 are arranged so as to orthogonally intersect with each other, the points of the intersections are arrayed in the shape of a matrix, and each of the matrix-shaped intersection points forms one display dot D.

In this modified embodiment, the opposing substrate 420 also has the concavity 420a, so that a liquid crystal forming a liquid crystal layer 442 enters both the concavity 10a of the substrate for the liquid crystal device 10 and the concavity 420a of the opposing substrate 420. Thus, the thickness "b" of the liquid crystal in the region thereof coinciding with the transmission portion 12a in plane can be increased more while the thickness "a" of the liquid crystal layer in the other region thereof is maintained unchanged.

On the other hand, according to this modified embodiment, in a case where the thickness "b" of the liquid crystal layer 442 in the region thereof corresponding to the transmission portion 12a is to be set equal to the thickness "b" in the embodiment in FIG. 4, the depth of each concavity 10a to be provided in the substrate for the liquid crystal device 10 and the concavity 420a to be provided in the opposing substrate 420 can be made smaller than the depth of the concavity 10a in the embodiment in FIG. 4. Thus, the occurrence of disconnecting the transparent electrode 16 attributed to the step of the concavity 10a can be mitigated.

Also, according to this modified embodiment, since each of the depths of the concavity 10a and the concavity 420a can be made smaller as compared with the depth of the concavity 10a in the embodiment in FIG. 4, it is possible to mitigate the occurrence of the drawback that, in a case where the transparent electrodes 422 are formed on the inner surfaces of the concavities 415a of the surface protection layer 415 by sputtering or where the transparent electrodes 16 are formed on the inner surfaces of the openings 25a of an insulating layer 25 by sputtering, the transparent electrodes 422 or the transparent electrodes 16 are not favorably formed on the inner surfaces of the concavities 415a or on the inner surfaces of the openings 25a.

Moreover, according to this modified embodiment, since each of the depths of the concavity 10a and the concavity 420a can be made smaller as compared with the depth of the concavity 10a in the embodiment in FIG. 4, a taper which is formed on the inner surface of each of the concavity 10a and the concavity 420a can be made a value which is closer to 90° than the value of the taper of the concavity 10a in the embodiment in FIG. 4. Thus, a region which the taper occupies in plane can be decreased, and the drawback of display attributed to the region occupied in plane by the taper can be mitigated.

Incidentally, the modified embodiment in FIG. 14 is applicable, not only to the liquid crystal device of passive matrix scheme as shown in FIG. 4, but also to the liquid crystal device of active matrix scheme having the TFD elements as shown in FIG. 6, or to the liquid crystal device of active matrix scheme having the TFT elements as shown in FIG. 9. Also, the TFD elements, the TFT elements or the likes may well be formed on the first base member which is provided with the reflection layer.

Also, the concavity 10a of the substrate for the liquid crystal device 10 has a depth b1 to the bottom of the concavity 10a from the surface of the substrate for the liquid crystal device 10 corresponding to the region thereof where a reflection portion 12r is formed. On the other hand, the concavity 420a of the opposing substrate 420 has a depth b2 to the bottom of the concavity 420a from the surface of the opposing substrate 420 corresponding to the region thereof where the reflection portion 12r is formed. Here in this modified embodiment, the concavity 10a and the concavity 420a are set so as to be related as b1>b2.

The reason for this is that the substrate for the liquid crystal device 10 is suited to form the concavity of great depth due to the relatively simple structure thereof, whereas the opposing substrate 420 which includes the colored layer 414 and which is accordingly relatively complicated in structure is not suited to form the deep concavity. In the case as in this modified embodiment where the depth b1 of the concavity 10a in the substrate for the liquid crystal device 10 having the simple structure is made great, and where the depth b2 of the concavity 420a in the opposing substrate 420 having the complicated structure is made small, the available percentages of the substrate for the liquid crystal device 10 and the opposing substrate 420 in the manufactures thereof can be enhanced.

Modified Embodiment 3

Figure 15:
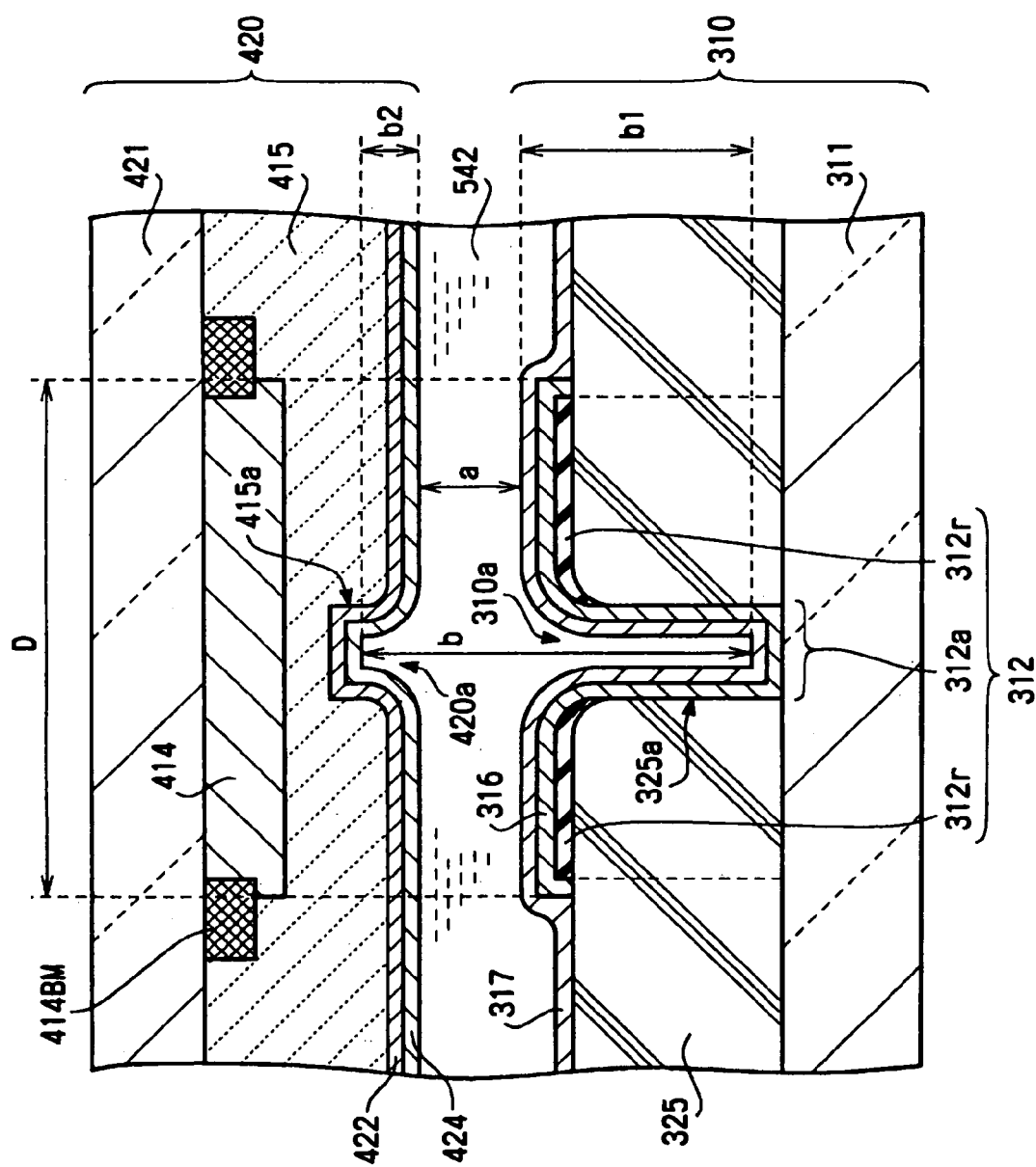
FIG. 15 is a sectional view showing one display dot portion of a liquid crystal device which is still another embodiment of the electrooptic device according to the present invention.

Next, another modified embodiment of a liquid crystal device will be described with reference to FIG. 15. This modified embodiment is the liquid crystal device which employs the substrate for the liquid crystal device 310 shown in FIG. 12 and the opposing substrate 420 shown in FIG. 14.

In the liquid crystal device of this construction, the substrate for the liquid crystal device 310 and the opposing substrate 420 are respectively provided with the concavities 310a and the concavities 420a, so that a liquid crystal forming a liquid crystal layer 542 enters both the concavities 310a and the concavities 420a. Thus, the thickness "b" of the liquid crystal layer 542 in the region thereof coinciding with each transmission portion 312a formed as the opening or the through hole, in plane can be increased more while the thickness "a" of the liquid crystal layer 542 in the other region thereof is maintained unchanged.

also, in a case where the thickness "b" of the liquid crystal layer 542 in the region thereof corresponding to the transmission portion 312a is to be set at a value equal to the value in the embodiment in FIG. 4, the depth of each of the concavity 310a to be provided in the substrate for the liquid crystal device 310 and the concavity 420a to be provided in the opposing substrate 420 can be made smaller than the depth of the concavity 10a in the embodiment in FIG. 4. Therefore, the occurrence of the disconnecting of the transparent electrode 316 attributed to the step of the concavity 310a can be mitigated.

Besides, according to this modified embodiment, since each of the depths of the concavity 310a and the concavity 420a can be made smaller as compared with the depth of the concavity 10a in the embodiment in FIG. 4, it is possible to mitigate the occurrence of the drawback that, in a case where the transparent electrodes 422 are formed on the inner surfaces of the concavities 415a of the surface protection layer 415 by sputtering or where the transparent electrodes 316 are formed on the inner surfaces of the openings 325a of the underlayer 325 by sputtering, the transparent electrodes are not favorably formed on the inner surfaces of the concavities 415a or on the inner surfaces of the openings 325a.

Besides, according to this modified embodiment, since each of the depths of the concavity 310a and the concavity 420a can be made smaller as compared with the depth of the concavity 10a in the embodiment in FIG. 4, a taper which is formed on the inner surface of each of the concavity 310a and the concavity 420a can be made a value which is closer to 90° than the value of the taper of the concavity 10a in the embodiment in FIG. 4, and a region which the taper occupies in plane can be decreased. Thus, the drawback of display attributed to the region occupied in plane by the taper can be mitigated.

Further, according to this modified embodiment, the underlayer 325 has a function as a raised bottom layer, and hence, the passing distance of light in reflection type display can be shortened, with the result that the transmission factor of the reflection type display can be enhanced more.

Incidentally, this modified embodiment is applicable, not only to the liquid crystal device of passive matrix scheme as shown in FIG. 4, but also to the liquid crystal device of active matrix scheme having the TFD elements as shown in FIG. 6, or to the liquid crystal device of active matrix scheme having the TFT elements as shown in FIG. 9. Also, the TFD elements, the TFT elements or the likes may well be formed on the first base member which is provided with the reflection layer.

Also, the concavity 310a of the substrate for the liquid crystal device 310 has a depth b1 to the bottom of the concavity 310a from the surface of the substrate for the liquid crystal device 310 corresponding to the region thereof where a reflection portion 312r is formed. On the other hand, the concavity 420a of the opposing substrate 420 has a depth b2 to the bottom of the concavity 420a from the surface of the opposing substrate 420 corresponding to the region thereof where the reflection portion 312r is formed. Here in this modified embodiment, the concavity 310a and the concavity 420a are set so as to be related as b1>b2.

The reason therefore this is that the substrate for the liquid crystal device 310 is suited to form the concavity of great depth due to the simple structure thereof, whereas the opposing substrate 420 which includes the colored layer 414 and which is accordingly complicated in structure is not suited to form the deep concavity. In the case as in this modified embodiment where the depth b1 of the concavity 310a in the substrate for the liquid crystal device 310 having the simple structure is made great, and where the depth b2 of the concavity 420a in the opposing substrate 420 having the complicated structure is made small, the available percentages of the substrate for the liquid crystal device 310 and the opposing substrate 420 in the manufacturing thereof can be enhanced.

Modified Embodiment 4

Next, still another modified embodiment of a liquid crystal device will be described with reference to FIG. 16. Since this modified embodiment is constructed similarly to the embodiment shown in FIG. 4, except the structure of a substrate for the liquid crystal device 610, similar portions shall be assigned the same signs and omitted from description.

Figure 16:
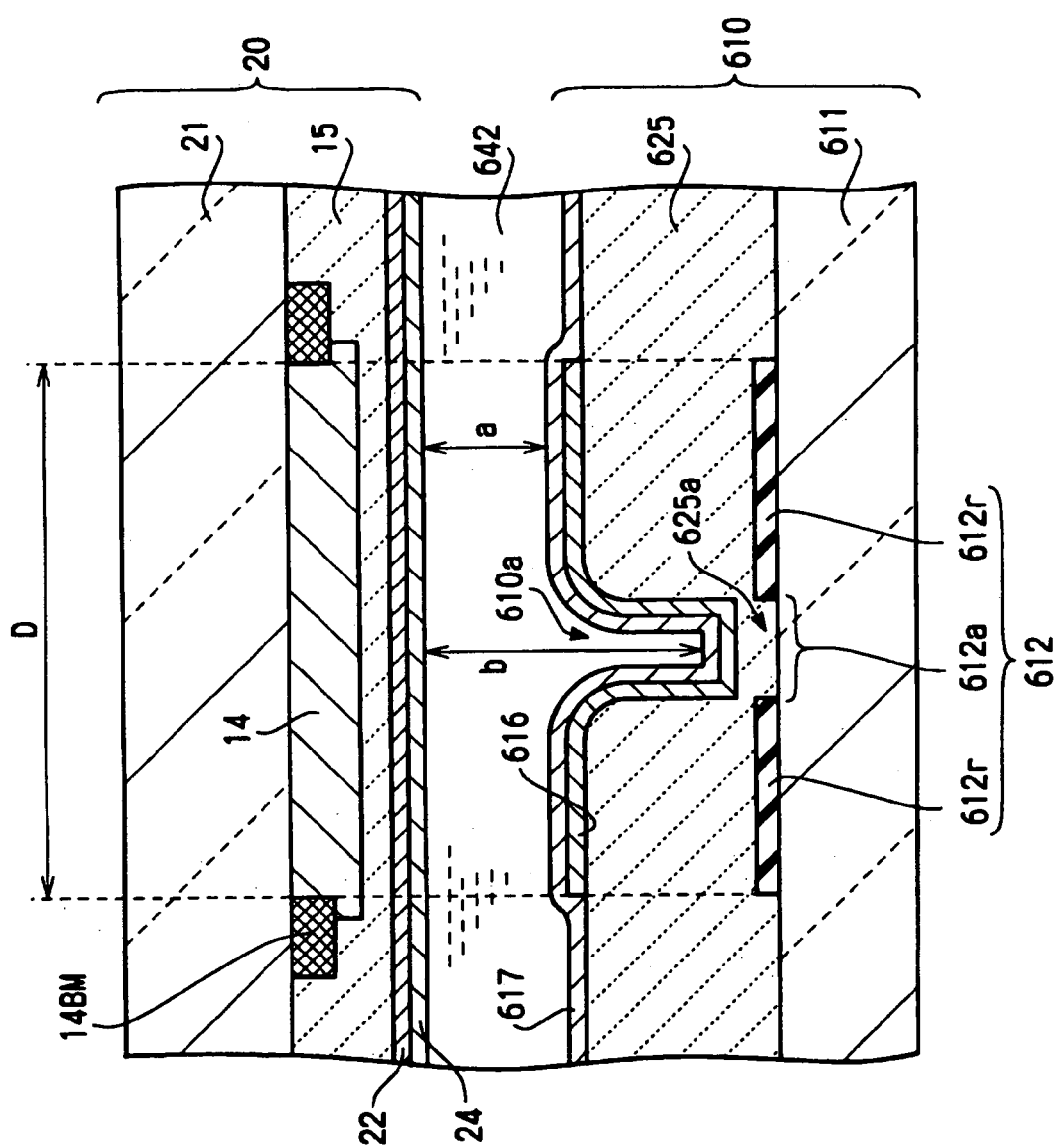
FIG. 16 is a sectional view showing one display dot portion of a liquid crystal device which is still another embodiment of the electrooptic device according to the present invention.

Referring to FIG. 16, a reflection layer 612 is formed on the surface of a first base member 611. The reflection layer 612 is formed of, for example, aluminum, silver or an alloy thereof, or laminated films of aluminum, silver or an alloy thereof and titanium, titanium nitride, molybdenum, tantalum or the like. Also, a transmission portion 612a for transmitting light is provided in the reflection layer 612 an opening or a through hole every display dot D.

An insulating layer 625 which is made of, for example, an inorganic material such as $SiO_2$ or $TiO_2$ or an organic resin such as acrylic resin or epoxy resin is formed on the reflection layer 612. The insulating layer 625 is provided with a region 625a which is thinner than any other region, and which coincides with the transmission portion 612a of the reflection layer 612 in plane.

Besides, each transparent electrode 616 made of a transparent conductor such as ITO is formed on the insulating layer 625, and an orientation film 617 made of a polyimide resin or the like is formed on the transparent electrode 616.

In the liquid crystal device of this construction, a liquid crystal forming a liquid crystal layer 642 enters each concavity 610a of the substrate for the liquid crystal device 610, so that the liquid crystal layer 642 thickens in the region thereof coinciding with the corresponding transmission portion 612a of the reflection layer 612. Thus, the same effect as that of the embodiment in FIG. 4 can be attained. Moreover, the thickness "b" of the liquid crystal layer can be regulated by regulating the thickness of the thinner region 625a of the insulating layer 625, whereby the thickness of the liquid crystal layer 642 can be set so as to attain the highest utilization efficiency of the transmitted light.

Incidentally, the modified embodiment in FIG. 16 is applicable, not only to the liquid crystal device of passive matrix scheme as shown in FIG. 4, but also to the liquid crystal device of active matrix scheme having the TFD elements as shown in FIG. 6, or to the liquid crystal device of active matrix scheme having the TFT elements as shown in FIG. 9. Besides, the TFD elements, the TFT elements or the likes may well be formed on the first base member which is provided with the reflection layer.

Embodiments of Electronic Equipment

Figure 17:
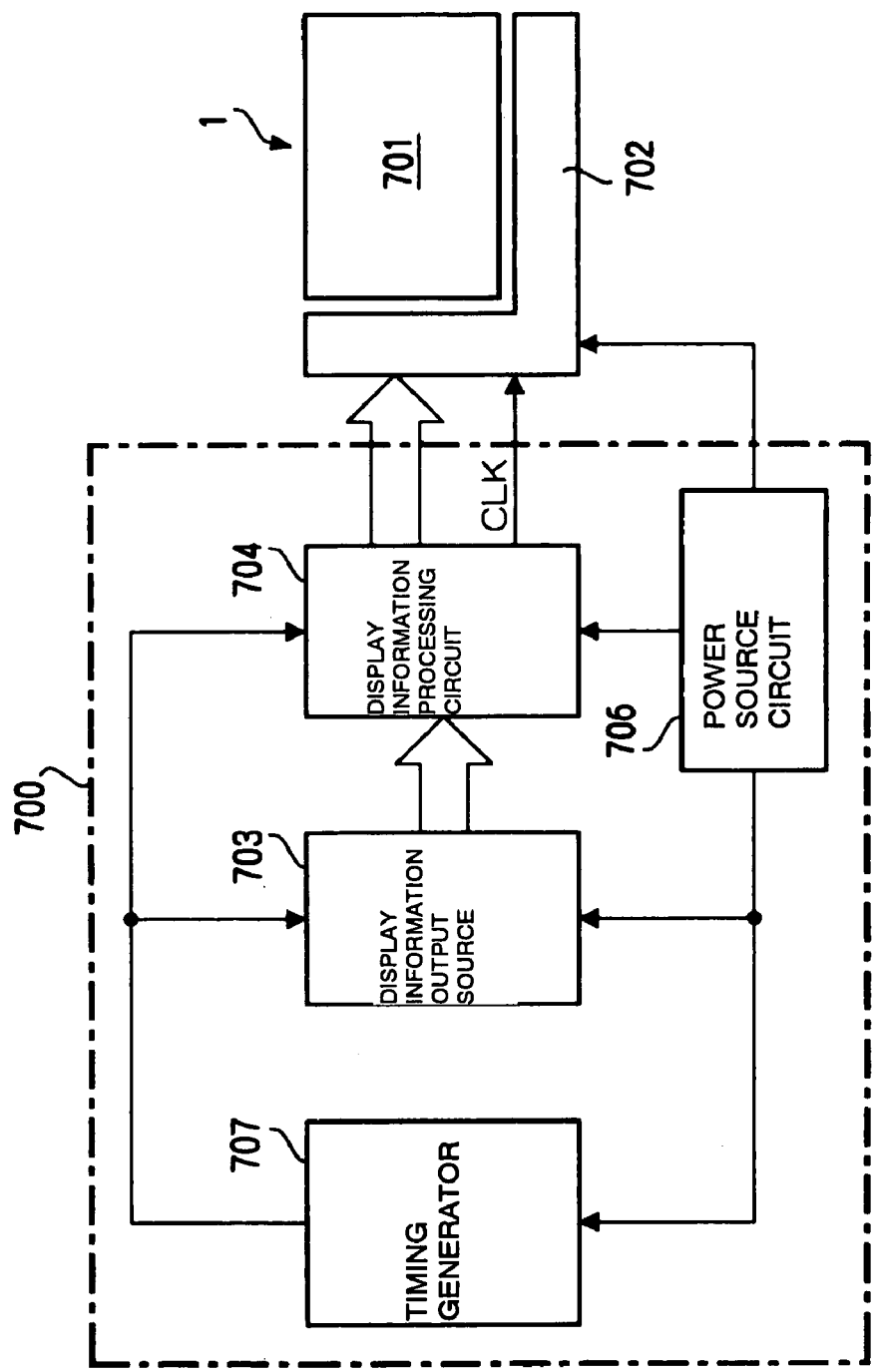
FIG. 17 is a block diagram showing one embodiment of an electronic equipment according to the present invention.

Next, there will be described an embodiment of an electronic equipment in which any of the liquid crystal devices thus far described is employed as a display unit. FIG. 17 shows the whole construction of the electronic equipment in this embodiment by a block diagram. The electronic equipment shown here includes the liquid crystal device 1, and control means 700 for controlling this liquid crystal device. The liquid crystal device 1 includes a panel structure member 701, and a drive circuit 702 which is constructed of a semiconductor IC or the like. Besides, the control means 700 includes a display information output source 703, a display information processing circuit 704, a power source circuit 706, and a timing generator 707.

The display information output source 703 includes a memory which is made up of a ROM (Read Only Memory), a RAM (Random Access Memory) or the like, a storage unit which is made up of a magnetic recording disk, an optical recording disk or the like, and a tuning circuit which tunes and outputs a digital image signal. It is so constructed that display information is supplied to the display information processing circuit 704 in the form of, for example, the image signal of predetermined format on the basis of various clock signals generated by the timing generator 707.

The display information processing circuit 704 includes various well-known circuits such as a serial-to-parallel conversion circuit, an amplification/inversion circuit, a rotation circuit, a gamma correction circuit and a clamp circuit, and it executes the processing of the inputted display information and supplies the resulting image information to the drive circuit 702 together with a clock signal CLK. The drive circuit 702 includes a scanning line driving circuit, a data line driving circuit, and an inspection circuit. Besides, the power source circuit 706 supplies respectively predetermined voltages to the above constituents.

Figure 18:
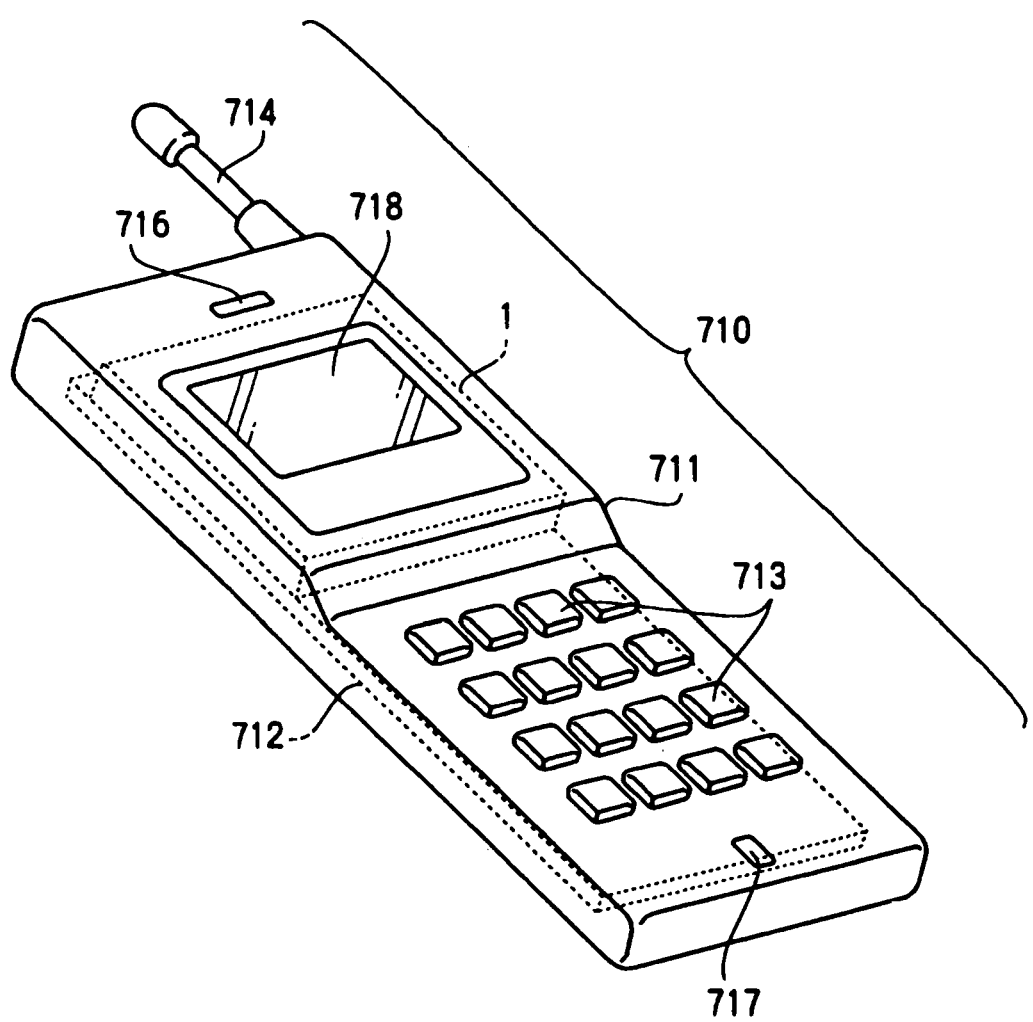
FIG. 18 is a perspective view showing a portable telephone which is another embodiment of an electronic equipment according to the present invention.
Figure 19:
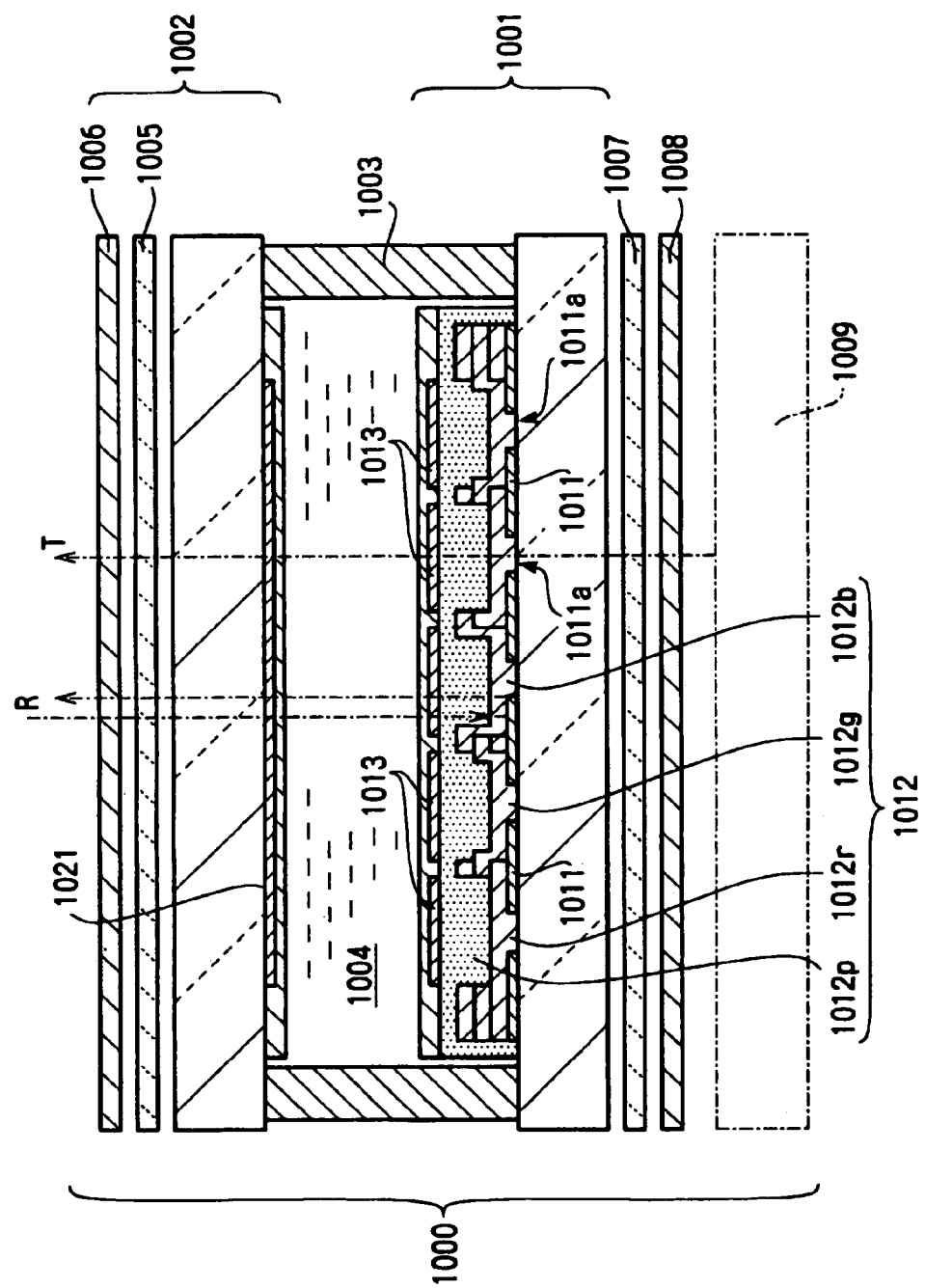
FIG. 19 is a sectional view showing a prior-art example of a liquid crystal device which is an example of an electrooptic device.

FIG. 18 shows a cellular telephone which is one embodiment of the electronic equipment according to the present invention. In the cellular telephone 710, a circuit board 712 is arranged inside a case member 711, and the foregoing liquid crystal device 1 is mounted on the circuit board 712. The display panel of the liquid crystal device 1, namely, the image display region A in FIG. 1 can be visually recognized from outside through a display window 718.

Operating buttons 713 are arrayed on the front surface of the case member 711, and an antenna 714 is attached so as to be freely drawn out of one end part and thereinto. A loudspeaker is arranged inside an earpiece 716, while a microphone is contained inside a mouthpiece 717.

Other Embodiments

The electrooptic device of the present invention is not restricted to the embodiments stated above, but that various alterations can be made within a scope not departing from the purport of the present invention. By way of example, the liquid crystal device shown in FIG. 1 has a structure wherein an IC chip is mounted directly on a board, namely, a structure of so-called "COG (Chip On Glass) scheme", but it can adopt instead of the structure a structure wherein the IC chip is mounted on the liquid crystal device through, for example, a flexible wiring board or a TAB board. Further, the present invention is also applicable to an electrooptic device which employs any electrooptic substance other than the liquid crystal, for example, EL emitting elements or the likes for an electrooptic substance.

The entire disclosure of Japanese Patent Application Nos. 2001-383023 filed Dec. 17, 2001 and 2002-303217 filed Oct. 17, 2002 are incorporated by reference herein.

The invention claimed is:

1. A substrate for an electrooptic device, the electrooptic device including display dots being arranged in a pattern, each the display dot including at least transmission portion and reflection portion, comprising:
   a light-transmissive base member;
   a reflection layer formed over said base member at the position corresponding to the reflection portion;
   a light transmission layer formed over said base member so as to overlap said reflection layer, said light transmission layer including a hollow at a position overlapping the transmission portion; and
   an orientation film formed over said base member so as to overlap said light transmission layer, said orientation film defining a concavity where said orientation film enters the hollow.

2. A substrate for an electrooptic device as defined in claim 1, wherein said light transmission layer includes a parent material and particles dispersed in the parent material, said particles having a refractive index different from a refractive index of said parent material.

3. A substrate for an electrooptic device defined in claim 1, wherein the transmission layer is formed at positions other than those corresponding to the hollow.

4. A substrate for an electrooptic device defined in claim 1, wherein the transmission layer is thinner at a position corresponding to the hollow than at a position corresponding to the reflection portion.

5. A substrate for an electrooptic device, the electrooptic device including display dots being arranged in a pattern, each the display dot including at least transmission portion and reflection portion comprising:
   a light-transmissive base member;
   an underlayer formed over said base member, said underlayer including a hollow;
   a reflection layer formed over said base member so as to overlap said underlayer at the position corresponding to the reflection portion;
   an transparent electrode formed over said reflection layer and contacting said reflection layer; and
   an orientation film formed over said base member so as to overlap said reflection layer;
   wherein the transmission portion and the hollow of said underlayer overlap each other in plane; and
   wherein said orientation film defines a concavity where said orientation film enters said hollow of said underlayer.

6. A substrate for an electrooptic device defined in claim 5, wherein the transmission layer is formed at positions other than those corresponding to the hollow.

7. A substrate for an electrooptic device defined in claim 5, wherein the transmission layer is thinner at a position corresponding to the hollow than at a position corresponding to the reflection portion.

8. A substrate for an electrooptic device, the electrooptic device including display dots being arranged in a pattern, each the display dot including at least transmission portion and reflection portion, comprising:
   a light-transmissive base member;
   a reflection layer formed over said base member at the position corresponding to the reflection portion;
   an insulating layer formed over said base member so as to overlap said reflection layer, said insulating layer including a hollow at a position overlapping the transmission portion in plane; and
   an orientation film formed over said base member so as to overlap said insulating layer, said orientation film defining a concavity where said orientation film enters the hollow.

9. A substrate for an electrooptic device defined in claim 8, wherein the transmission layer is formed at positions other than those corresponding to the hollow.

10. A substrate for an electrooptic device defined in claim 8, wherein the transmission layer is thinner at a position corresponding to the hollow than at a position corresponding to the reflection portion.

11. An electrooptic device comprising:
    a first substrate as defined in claim 1;
    a second substrate arranged opposite said first substrate; and
    a liquid crystal layer interposed between said first substrate and said second substrate;
    wherein, letting "a" denote a thickness of said liquid crystal layer at a position corresponding to said reflection portion, and "b" denote a thickness of said liquid crystal layer at a position corresponding to said transmission portion, the following relational formula is satisfied:

$1.8a \leq b \leq 2.4a$.

12. An electrooptic device as defined in claim 11, wherein, letting $\Delta na$ denote a product between a refractive index anisotropy $\Delta n$ of a nematic liquid crystal which forms said liquid crystal layer, and said thickness "a" of said liquid crystal layer at the position corresponding to said reflection portion, and letting $\Delta nb$ denote a product between the refractive index anisotropy $\Delta n$ of the nematic liquid crystal and said thickness "b" of said liquid crystal layer at the position corresponding to said transmission portion, the following relational formula is satisfied:

$1.8 \times \Delta na \leq \Delta nb \leq 2.4 \times \Delta na$.

13. An electrooptic device comprising:
    a first substrate as defined in claim 1; and
    a second substrate arranged opposite said first substrate;
    wherein said second substrate includes an electrode arranged so as to overlap said reflection layer in plane, and a switching element connected to said electrode.

14. An electrooptic device comprising:
    a first substrate as defined in claim 1; and
    a second substrate arranged opposite said first substrate;
    wherein the second substrate including color layers corresponding to the reflection layer and an light shield film disposed between the color layers, the light shielding film having an edge adjacent a first color layer of the color layers, the edge of the light shielding film being substantially aligned with an edge of the reflection layer.

15. An electrooptic device including display dots being arranged in a pattern, each the display dot including at least transparent portion and reflection portion, comprising:
    a first substrate including a reflection layer at the position corresponding to the reflection portion and a light transmission layer formed over the reflection layer, the light transmission layer including a hollow at a position overlapping the transmission portion;

a second substrate having an electrode and a switching element connected to the electrode; and a liquid crystal layer interposed between the first substrate and the second substrate;

wherein a thickness of the liquid crystal layer at a position corresponding to said transmission portion is larger than a thickness of the liquid crystal layer at a position corresponding to said reflection portion.

16. An electrooptic device defined in claim 15, wherein the transmission layer is formed at positions other than those corresponding to the hollow.

17. An electrooptic device defined in claim 15, wherein the transmission layer is thinner at a position corresponding to the hollow than at a position corresponding to the reflection portion.

18. An electrooptic device including display dots being arranged in a pattern, each the display dot including at least transparent portion and reflection portion, comprising:

a first substrate including a reflection layer at the position corresponding to the reflection portion and a light transmission layer formed over the reflection layer, the light transmission layer including a hollow at a position overlapping the transmission portion;

a second substrate including color layers corresponding to the reflection layer and an light shield film disposed between the color layers, the light shielding film having an edge adjacent a first color layer of the color layers, the edge of the light shielding film being substantially aligned with an edge of the reflection layer; and a liquid crystal layer interposed between the first substrate and the second substrate;

wherein a thickness of the liquid crystal layer at a position corresponding to said transmission portion is larger than a thickness of the liquid crystal layer at a position corresponding to said reflection portion.

19. An electrooptic device defined in claim 18, wherein the transmission layer is formed at positions other than those corresponding to the hollow.

20. An electrooptic device defined in claim 18, wherein the transmission layer is thinner at a position corresponding to the hollow than at a position corresponding to the reflection portion.

21. An electrooptic device including display dots being arranged in a pattern, each the display dot including at least transparent portion and reflection portion, comprising:

a first substrate;

an underlayer formed over a first substrate, the underlayer including a hollow, a reflection layer formed over the first substrate so as to overlap said underlayer at the position corresponding to the reflection portion;

an transparent electrode formed over the reflection layer and contacting the reflection layer; and a liquid crystal layer interposed between the first substrate and the second substrate, wherein the transmission portion and the hollow of said underlayer overlap each other in plane, and a thickness of the liquid crystal layer at a position corresponding to said transmission portion is larger than a thickness of the liquid crystal layer at a position corresponding to said reflection portion.

22. An electrooptic device defined in claim 21, wherein the transmission layer is formed at positions other than those corresponding to the hollow.

23. An electrooptic device defined in claim 21, wherein the transmission layer is thinner at a position corresponding to the hollow than at a position corresponding to the reflection portion.

24. An electrooptic equipment comprising an electrooptic device as defined in claim 21 and control means for controlling an operation of said electrooptic device.

* * * * *